(12) United States Patent
Kim et al.

(10) Patent No.: US 9,791,602 B2
(45) Date of Patent: Oct. 17, 2017

(54) NANOWIRE BUNDLE ARRAY, ULTRAHIGH-PERFORMANCE BROADBAND OPTICAL FILM, AND METHOD OF MANUFACTURING THE SAME

(71) Applicant: INDUSTRY-ACADEMIC COOPERATION FOUNDATION, YONSEI UNIVERSITY, Seoul (KR)

(72) Inventors: Kyoung Sik Kim, Seoul (KR); Gu Min Kang, Seoul (KR); Kyu Young Bae, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 2 days.

(21) Appl. No.: 15/010,044

(22) Filed: Jan. 29, 2016

(65) Prior Publication Data

US 2017/0123115 A1 May 4, 2017

(30) Foreign Application Priority Data

Oct. 30, 2015 (KR) ........................ 10-2015-0152643

(51) Int. Cl.
*G02B 5/02* (2006.01)
*B82Y 20/00* (2011.01)

(52) U.S. Cl.
CPC ............ *G02B 5/0247* (2013.01); *G02B 5/02* (2013.01); *G02B 5/0268* (2013.01); *G02B 5/0278* (2013.01); *B82Y 20/00* (2013.01); *Y10S 977/766* (2013.01)

(58) Field of Classification Search
CPC ...... G02B 5/0242; G02B 5/02; G02B 5/0268; G02B 5/021; G02B 5/0221; G02B 5/0226; G02B 5/0273
USPC ........................................................ 359/599
See application file for complete search history.

(56) References Cited

U.S. PATENT DOCUMENTS

| | | | | |
|---|---|---|---|---|
| 7,098,393 B2* | 8/2006 | Fleurial | ................... | H01L 35/32 136/201 |
| 7,898,658 B2* | 3/2011 | Moskovits | ........... | G01N 21/658 356/301 |
| 8,865,402 B2* | 10/2014 | Zhang | ................... | B01J 19/0046 422/82.01 |
| 2003/0193709 A1* | 10/2003 | Mallya | ................... | G02F 1/1334 359/245 |

(Continued)

FOREIGN PATENT DOCUMENTS

| | | |
|---|---|---|
| JP | 2005-228936 A | 8/2005 |
| JP | 2010-514207 A | 4/2010 |

(Continued)

OTHER PUBLICATIONS

Xiao et al., "Controlled Electrochemical Synthesis of Conductive Polymer Nanotube Structures", J. Am. Chem. Soc. 2007, 129, 4483-4489.*

(Continued)

*Primary Examiner* — William R Alexander
(74) *Attorney, Agent, or Firm* — Sughrue Mion, PLLC

(57) ABSTRACT

Disclosed are a nanowire bundle array performing optical haze control for enhancing optical characteristics of optoelectronic device systems and optical systems, an ultrahigh-performance broadband optical film, and a method of manufacturing the same.

18 Claims, 30 Drawing Sheets

(56) References Cited

U.S. PATENT DOCUMENTS

| | | | |
|---|---|---|---|
| 2005/0128788 A1* | 6/2005 | Segal | B82Y 10/00 |
| | | | 365/151 |
| 2008/0149944 A1 | 6/2008 | Samuelson et al. | |
| 2010/0112373 A1* | 5/2010 | Coffey | B32B 33/00 |
| | | | 428/608 |
| 2010/0266897 A1* | 10/2010 | Lee | B82Y 10/00 |
| | | | 429/219 |
| 2011/0249322 A1 | 10/2011 | Wang et al. | |
| 2013/0107250 A1 | 5/2013 | Wu et al. | |
| 2014/0079921 A1 | 3/2014 | De Volder | |

FOREIGN PATENT DOCUMENTS

| | | |
|---|---|---|
| JP | 2011-503834 A | 1/2011 |
| JP | 2014-523382 A | 9/2014 |
| JP | 2016-053212 A | 4/2016 |
| KR | 10-2002-0054484 A | 7/2002 |
| KR | 10-2008-0003997 A | 1/2008 |
| KR | 10-2012-0082409 A | 7/2012 |

OTHER PUBLICATIONS

Kang et al., "Broadband and ultrahigh optical haze thin films with self-aggregated alumina nanowire bundles for photovoltaic applications", Energy Environ. Sci., Jul. 2015, 8, 2650-2656.*
Communication dated Jun. 5, 2017 from the Korean Patent Office in corresponding application No. 10-2015-0152643.
Communication dated Feb. 21, 2017 from a Japanese Patent Office in counterpart Japanese Patent Application No. 2016-014119.
Communication dated Jan. 2, 2017 from a Korean Patent Office in counterpart Korean Patent Application No. 10-2015-0152643.

* cited by examiner

100

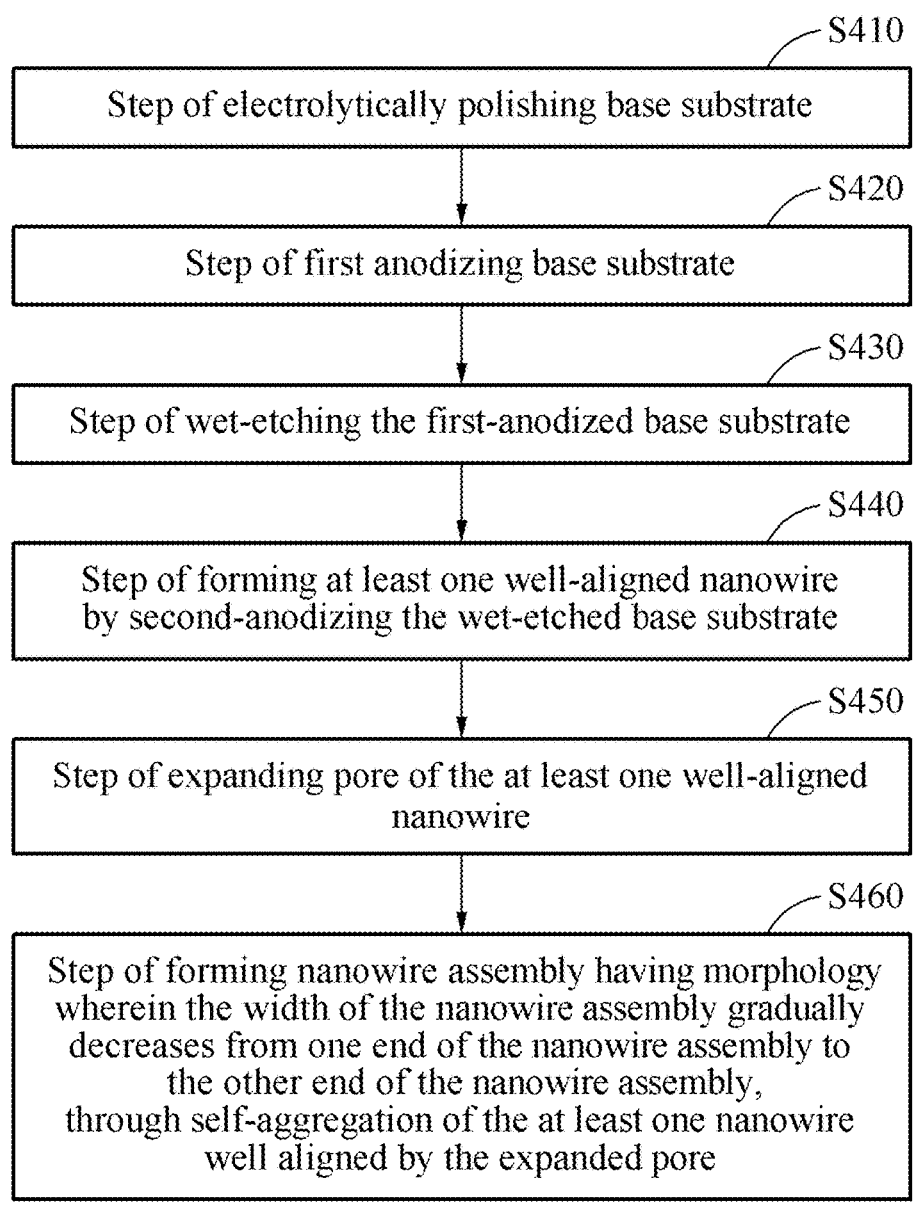

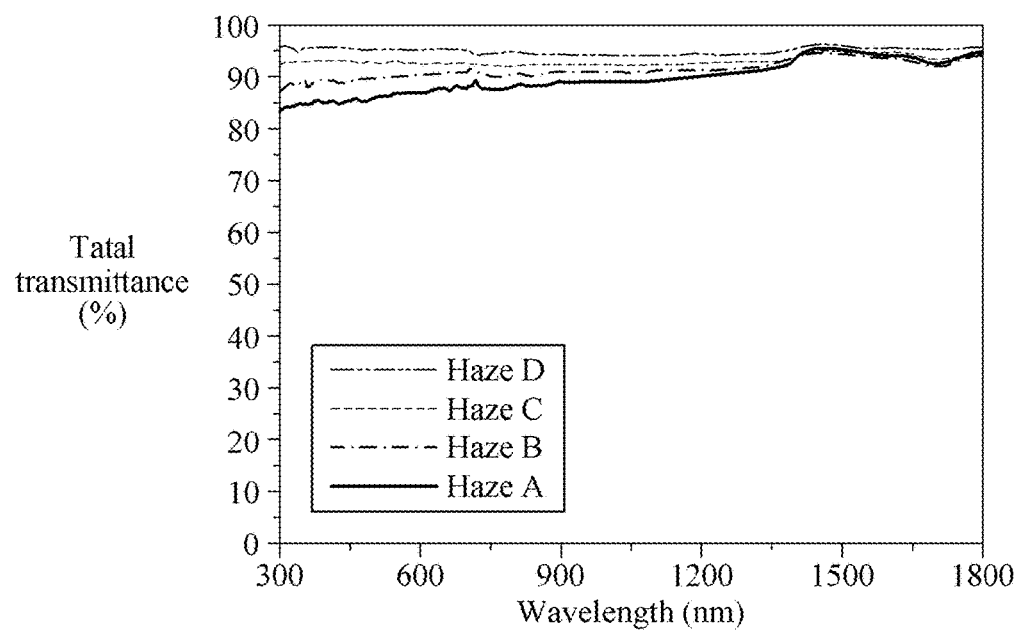

NANOWIRE BUNDLE ARRAY, ULTRAHIGH-PERFORMANCE BROADBAND OPTICAL FILM, AND METHOD OF MANUFACTURING THE SAME

CROSS-REFERENCE TO RELATED APPLICATION

This application claims the priority benefit of Korean Patent Application No. 10-2015-0152643, filed on Oct. 30, 2015 in the Korean Intellectual Property Office, the disclosure of which is incorporated herein by reference.

BACKGROUND OF THE INVENTION

Field of the Invention

Embodiments of the present invention relates to a nanowire bundle array controlling a path of incident light by controlling morphology, an optical film, and a method of manufacturing the same.

Description of the Related Art

Control of optical and thermal characteristics of displays or windows is one of important light management strategies to provide efficient light systems to increase performance of optoelectronic devices.

So as to realize a device for efficiently collecting propagating, and scattering light incident upon the interiors and exteriors of optoelectronic devices, research into various nanostructure types having various shapes has been conducted. Since nanostructures based on a dielectric substance do not exhibit loss by parasitic absorption frequently occurring in nanostructures based on metal and have almost no effect on electrical properties of a device, the dielectric substance-based nanostructures are spotlighted as technology of efficiently controlling light flow and allowing simple design.

Meanwhile, researchers of the University of Maryland manufactured transparent paper with a high packing density by chemically treating cellulose fiber, a component of wood, having a several micrometer diameter and a high-performance light diffusing film based on the same, in 2014.

When such a light diffusing film based on a transparent paper is used, the film has a relatively thick thickness of several micrometers or more and, since paper based on cellulose fiber of wood is mainly used, is easily deformed at high temperature.

In addition, when a haze material scattering light is prepared using a method of manufacturing the light diffusing film based on the transparent paper, chemical treatment or compression by means of a machine is used, and thus, hazardous chemicals are used or high-cost equipment is required.

Accordingly, demand for a technology for controlling light characteristics to enhance performance of optoelectronic systems or optical systems is gradually increasing.

RELATED DOCUMENTS

Patent Document

Korean Patent Laid-Open Publication No. 10-2002-0054484 (2002, Jul. 8, entitled "Multilayer hologram diffuser and method of manufacturing the same")

SUMMARY OF THE INVENTION

Therefore, the present invention has been made in view of the above problems, and it is an object of the present invention to provide a nanowire bundle array for controlling at least one optical characteristic of total transmittance, diffusion transmittance and optical haze to enhance characteristics of optoelectronic device systems and optical systems, an ultrahigh-performance broadband optical film, and a method of manufacturing the same.

It is another object of the present invention to provide a nanowire bundle array for enhancing optical characteristics of optoelectronic device systems and optical systems by controlling an optical path through control of morphology of a nanowire assembly, an ultrahigh-performance broadband optical film, and a method of manufacturing the same.

It is another object of the present invention to provide a thin nanowire bundle array having superior optical characteristics, an ultrahigh-performance broadband optical film, and a method of manufacturing the same.

It is another object of the present invention to provide a heat-resistant nanowire bundle array which is not deformed at high temperature, an ultrahigh-performance broadband optical film, and a method of manufacturing the same.

It is another object of the present invention to provide a nanowire bundle array exhibiting a high haze value of 99% or more and a high transmittance of 85% or more, an ultrahigh-performance broadband optical film, and a method of manufacturing the same.

It is yet another object of the present invention to provide a nanowire bundle array which is economical, uses a safe material, and is manufactured through easy wet-etching, an ultrahigh-performance broadband optical film, and a method of manufacturing the same.

In accordance with the present invention, the above and other objects can be accomplished by the provision of a nanowire bundle array, including a nanowire assembly composed of at least one nanowire and having morphology configured such that a width of the nanowire assembly is gradually decreased from one end of the nanowire assembly to the other end of the nanowire assembly, wherein a plurality of nanowire assemblies is spaced from each other by a predetermined interval in the nanowire bundle array and the nanowire bundle array controls a path of incident light by controlling the morphology.

The morphology may be formed through self-aggregation by capillary force between any one of the at least one nanowire and other nanowires.

In addition, the morphology may be formed by some of the nanowires aggregated while being bent toward each other through capillary force induced by surface tension of a fluid between the nanowires.

The nanowire bundle array may have optical haze by controlling scattering of the light based on morphology including a plurality of nano-voids and a plurality of nano-ridges.

The morphology may include a funnel structure as a nanowire assembly unit composed of the at least one nanowire, the funnel structure is formed on a microscale, and a plurality of funnel structures may be spaced from each other on a microscale distance.

With regard to the morphology, any one of the at least one nanowire may be titled in a certain direction and supported by and bonded to other nanowires.

With regard to the morphology, at least one nanowire in a bent state may be bonded with other nanowires.

With regard to the morphology, the at least one nanowire at an upper part of the nanowire assembly may be aggregated, the at least one nanowire at a lower part of the nanowire assembly may be spaced from one another.

The nanowire assembly may be separatively attached to an upper part of an adhesive substrate.

The nanowire bundle array may increase efficiency of at least one of an optoelectronic device, a photothermal device, and an optical device by controlling transmittance and diffusion of the light.

The at least one nanowire may be made of any one of alumina ($Al_2O_3$) and titanium dioxide ($TiO_2$).

The length of each of the at least one nanowire may be 100 nm to 50 μm. According to an embodiment, the thickness of each of the at least one nanowire may be 10 nm to 70 nm, and an interval between the at least one nanowire may be 500 nm or less.

The height of the nanowire assembly may be 100 nm to 30 μm. In accordance with an aspect of the present invention, the above and other objects can be accomplished by the provision of a nanowire bundle array, including a base substrate; and nanowire assemblies spaced from each other by a predetermined interval on the base substrate, wherein the nanowire assemblies include at least one nanowire and have morphology in which a width gradually decreases from one end contacting the base substrate to the other end.

The morphology may be formed through self-aggregation by capillary force between any one of the at least one nanowire and other nanowires.

With regard to the morphology, the nanowires at an upper part of the nanowire assembly may be aggregated, the nanowires at a lower part of the nanowire assembly may be spaced from each other.

The nanowire bundle array may increase efficiency of at least one of an optoelectronic device, a photothermal device, and an optical device by controlling transmittance and diffusion of the light.

In accordance with yet another aspect of the present invention, there is provided a method of manufacturing a nanowire bundle array, the method including: electrolytically polishing a base substrate; forming at least one nanowire on the base substrate by anodizing the base substrate; expanding pores of the at least one nanowire; and forming a nanowire assembly having a morphology configured such that a width of the nanowire assembly gradually decreases from one end of the nanowire assembly to the other end of the nanowire assembly, by controlling self-aggregation of the at least one nanowire having the expanded pores.

In the forming of the nanowire assembly having the morphology, the morphology may be formed by some of the nanowires aggregated while being bent toward each other through capillary force induced by surface tension of a fluid between the nanowires aligned by expansion of the pores.

BRIEF DESCRIPTION OF THE DRAWINGS

The above and other objects, features and other advantages of the present invention will be more clearly understood from the following detailed description taken in conjunction with the accompanying drawings, in which:

FIG. 4 illustrates a flowchart of a method of manufacturing a nanowire bundle array according to an embodiment of the present invention;

FIGS. 9A to 9C respectively illustrate total transmittance, diffusion transmittance and haze characteristics of a haze film to which a nanowire bundle array according to an embodiment of the present invention is applied;

DETAILED DESCRIPTION OF THE INVENTION

Figure 1A:
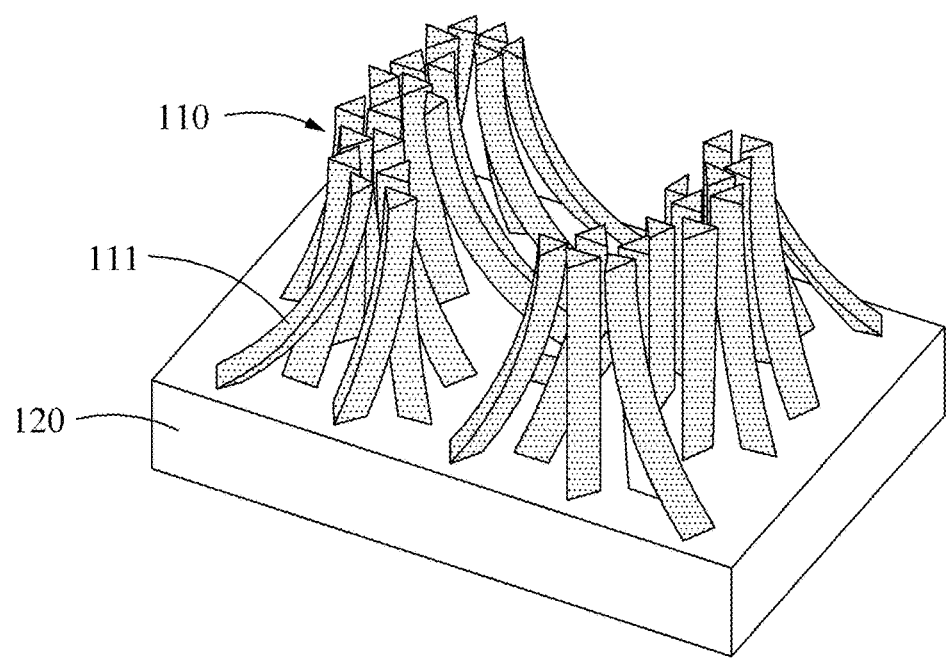
FIGS. 1A and 1B illustrate nanowire bundle arrays according to an embodiment of the present invention.

The present invention will now be described more fully with reference to the accompanying drawings, in which exemplary embodiments of the invention are shown. This invention may, however, be embodied in many different forms and should not be construed as limited to the exemplary embodiments set forth herein. Like reference numerals in the drawings denote like elements.

The terminology used in the present disclosure serves the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "includes" and/or "including," when used in this specification, specify the presence of stated features, steps, operations, elements, and/or components, but do not preclude the presence or addition of one or more other features, steps, operations, elements, components, and/or groups thereof.

It should not be understood that arbitrary aspects or designs disclosed in "embodiments", "examples", "aspects", etc. used in the specification are more satisfactory or advantageous than other aspects or designs.

In addition, the expression "or" means "inclusive or" rather than "exclusive or". That is, unless otherwise mentioned or clearly inferred from context, the expression "x uses a or b" means any one of natural inclusive permutations.

Further, as used in the description of the invention and the appended claims, the singular forms "a", "an" and "the" are intended to include the plural forms as well, unless context clearly indicates otherwise.

Although terms used in the specification are selected from terms generally used in related technical fields, other terms may be used according to technical development and/or due to change, practices, priorities of technicians, etc. Therefore, it should not be understood that terms used below limit the technical spirit of the present invention, and it should be understood that the terms are exemplified to describe embodiments of the present invention.

Also, some of the terms used herein may be arbitrarily chosen by the present applicant. In this case, these terms are defined in detail below. Accordingly, the specific terms used herein should be understood based on the unique meanings thereof and the whole context of the present invention.

Meanwhile, terms such as "first" and "second" are used herein merely to describe a variety of constituent elements, but the constituent elements are not limited by the terms. The terms are used only for the purpose of distinguishing one constituent element from another constituent element.

In addition, when an element such as a layer, a film, a region, and a constituent is referred to as being "on" another element, the element can be directly on another element or an intervening element can be present.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Meanwhile, in the following description of the present invention, a detailed description of known functions and configurations incorporated herein will be omitted when it may make the subject matter of the present invention unclear. The terms used in the specification are defined in consideration of functions used in the present invention, and can be changed according to the intent or conventionally used methods of clients, operators, and users. Accordingly, definitions of the terms should be understood on the basis of the entire description of the present specification.

Figure 1B:
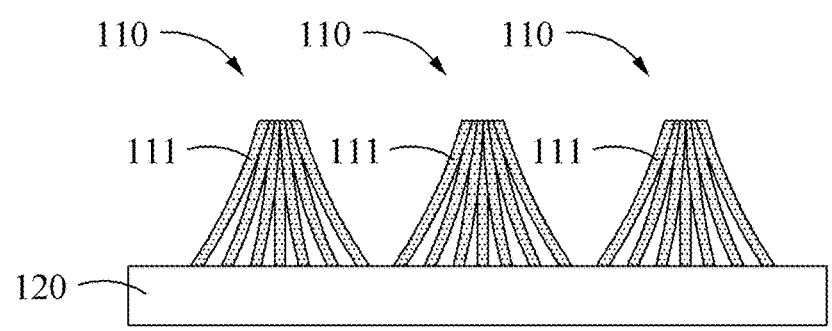

FIGS. 1A and 1B illustrate nanowire bundle arrays according to an embodiment of the present invention.

Referring to FIGS. 1A and 1B, a nanowire bundle array 100 according to an embodiment of the present invention includes a nanowire assembly 110.

The nanowire assembly 110 is composed of at least one nanowire 111 and has morphology configured such that the width of the nanowire assembly gradually decreases from one end of the nanowire assembly to the other end of the nanowire assembly.

The morphology may be self-aggregated by capillary force between any one of the at least one nanowire 111 and another nanowire.

For example, the morphology may be formed by some of the nanowires aggregated while being bent toward each other through capillary force induced by surface tension of a fluid between the nanowires.

Here, the at least one nanowire may have a well-aligned structure.

According to an embodiment, with regard to the morphology, any one of the at least one nanowire 111 may be titled in a certain direction and supported by and bonded to other nanowires.

In addition, with regard to the morphology, at least one nanowire 111 in a bent state may be bonded with other nanowires.

For example, the morphology may be formed because the at least one nanowire 111, which is included in the nanowire assembly 110, having flexibility is bonded with other nanowires in a bent state.

More particularly, the at least one nanowire 111 is made of a material having flexibility, and the at least one nanowire has flexibility, thus having the morphology wherein the at least one nanowire leans on other nanowires in a bent state.

In addition, with regard to the morphology, the at least one nanowire 111 at an upper part of the nanowire assembly may be aggregated, and the nanowires 111 at a lower part of the nanowire assembly may be spaced from one another.

According to an embodiment, the nanowire bundle array 100 may have optical haze by controlling scattering of light based on morphology including a plurality of nano-voids and a plurality of nano-ridges.

Here, the expression "optical haze" indicates a ratio of a diffusion transmittance in the total transmittance of light passing through a nanowire bundle array. Optical haze is one of the most important factors in development of efficient optical and optoelectronic devices. The plurality of nano-voids and nano-ridges described above are described in more detail referring to FIGS. 8A to 8d below.

In addition, the morphology may include a funnel structure as a nanowire assembly unit composed of at least one nanowire. The funnel structure may be microscale, and thus, a plurality of funnel structures is spaced from each other on a microscale distance.

In addition, the nanowire bundle array 100 may increase efficiency of at least one of an optoelectronic device, a photothermal device, and an optical device by controlling transmittance and diffusion of the light.

For example, the nanowire bundle array 100 may be a haze film for increasing optical efficiency of optoelectronic devices by controlling light transmittance and diffusion.

The haze film has the optical haze characteristics described above. The nanowire bundle array according to an embodiment of the present invention may be a haze film. Transmittance and diffusion transmittance of light passing through the haze film is controlled by adhering the haze film to an optoelectronic device, and thus, optical efficiency of the optoelectronic device may be increased.

In addition, the nanowire assembly 110 may be separatively attached to an adhesive substrate (not shown).

For example, as in the case that the nanowire assembly 110 is formed using an adhesive substrate such as an adhesive tape, the nanowire assembly 110 may be separated from a base substrate 120.

In addition, the separated nanowire assembly 110 is attached to an optoelectronic device to be used as a haze film.

In this regard, the nanowire bundle array 100 according to another embodiment of the present invention may further include the base substrate 120 supporting the nanowire assembly 110.

According to an embodiment, the base substrate 120 may be made of aluminum and the at least one nanowire 111 may be made of alumina. However, materials of the base substrate 120 and the nanowire 111 are not limited to the aforementioned materials and may be made of various materials depending upon manufacturing methods.

In addition, the at least one nanowire 111 may be a dielectric, for example, titanium dioxide ($TiO_2$). However, the present invention is not limited thereto and any materials which allow transmittance and diffusion of light in applied applications may be used.

In addition, the height of the nanowire assembly 110 may be 100 nm to 30 μm, and an interval between ridges of the nanowire assembly 110 may be 1 μm to 70 μm.

The at least one nanowire 111 may be made of alumina, and the length of each of one or more nanowires 111 may be 100 nm to 50 μm.

In addition, the thickness of each of the nanowires 111 may be 10 nm to 70 nm, and an interval between the nanowires 111 may be 500 nm or less.

In addition, the at least one nanowire 111 according to an embodiment may have a triangular prism shape with a triangular cross section in a longitudinal direction, but may have various shapes depending upon methods of manufacturing the same. Hereinafter, a morphology formation process of the nanowire bundle array is described in detail referring to FIG. 2.

Figure 2A:
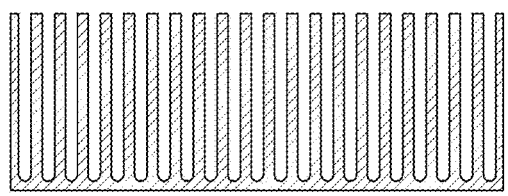
FIGS. 2A to 2C illustrate a morphology formation process of a nanowire bundle array according to an embodiment of the present invention.
Figure 2B:
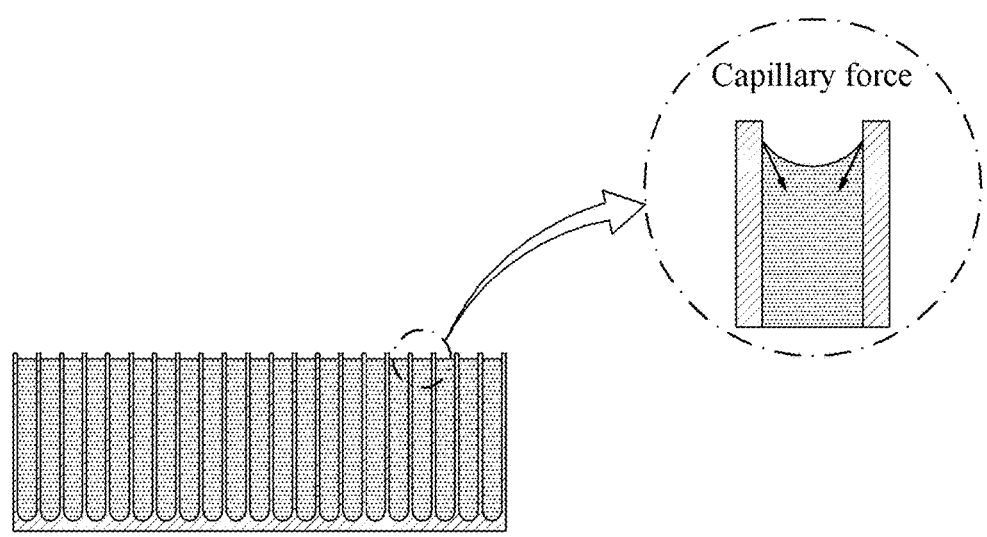
Figure 2C:
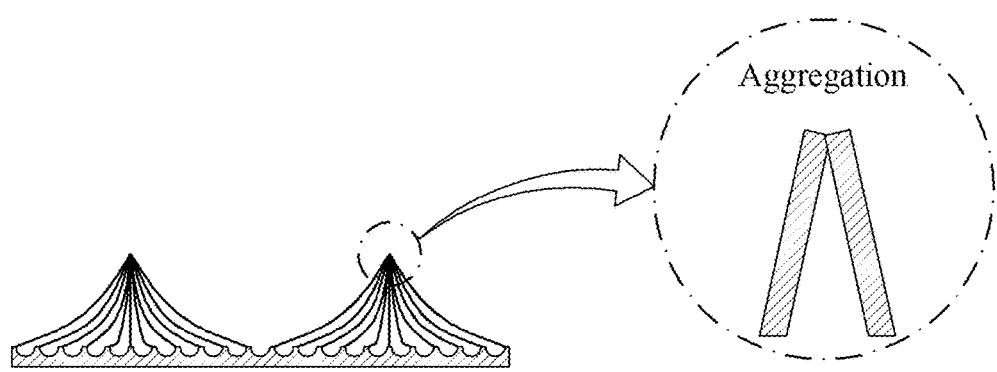

FIGS. 2A to 2C illustrate a morphology formation process of the nanowire bundle array according to an embodiment of the present invention.

Referring to FIGS. 2A to 2C, the nanowire assembly according to an embodiment of the present invention has a morphology wherein the width of the nanowire assembly gradually decreases from one end of the nanowire assembly to the other end of the nanowire assembly.

The nanowire assembly according to an embodiment of the present invention may have a morphology wherein the width of the nanowire assembly gradually decreases from one end of the nanowire assembly to the other end of the nanowire assembly, by expanding pores of at least one well-aligned nanowire (See FIG. 2B) after forming the at least one well-aligned nanowire by anodizing the base substrate twice (See FIG. 2A), and then, by allowing self-aggregation of the at least one well-aligned nanowire having the expanded pores.

As illustrated in FIGS. 2A to 2C, the nanowire assembly forms at least one well-aligned nanowire by anodizing the base substrate twice. However, the at least one nanowire may be an irregularly arranged structure, i.e., the at least one nanowire might not be well aligned.

As illustrated in FIG. 2C, the morphology may be formed through self-aggregation by capillary force between the nanowire and the other nanowire.

For example, when a liquid is present between the vertically formed nanowires, self-aggregation may occur through capillary force generated by interaction of cohesive force of liquid molecules and adhesive force between a liquid and a capillary wall.

More particularly, the morphology according to the present invention may be formed when some of the nanowires are bent toward each other and aggregated by capillary force, which is induced by surface tension of a fluid, acting between the well-aligned nanowires.

Figure 3A:
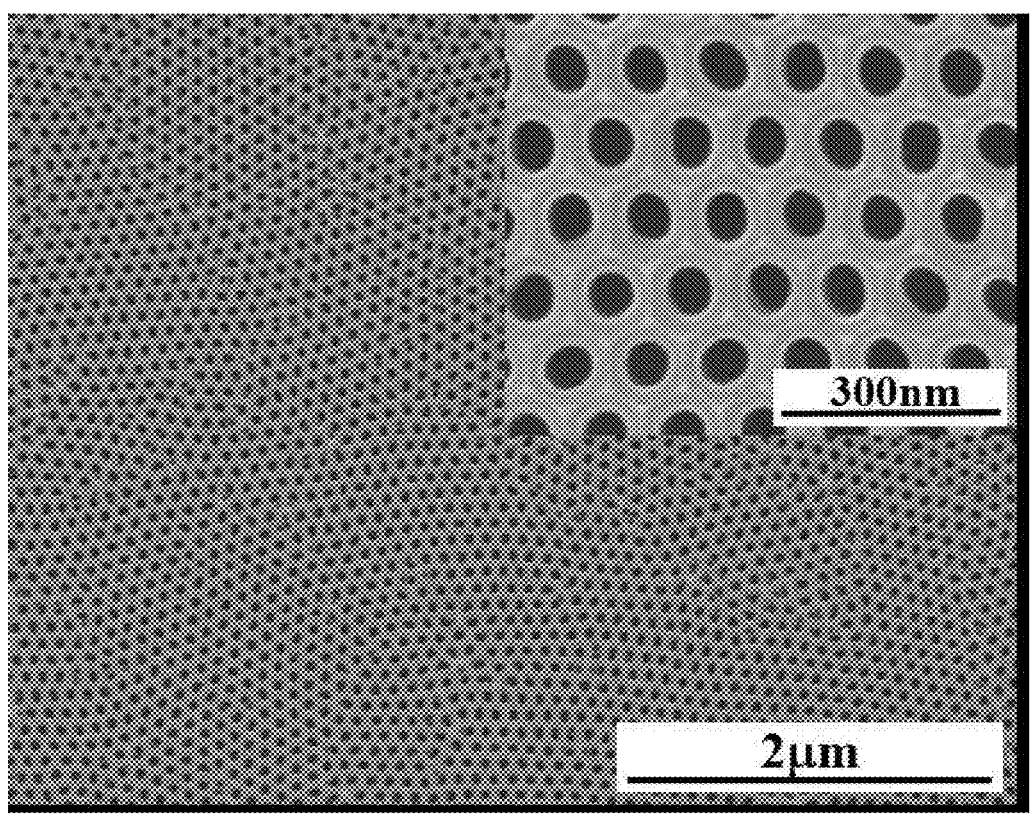
FIGS. 3A and 3B illustrate scanning electron microscope (SEM) images of at least one nanowire and nanowire assembly aligned according to an embodiment of the present invention.
Figure 3B:
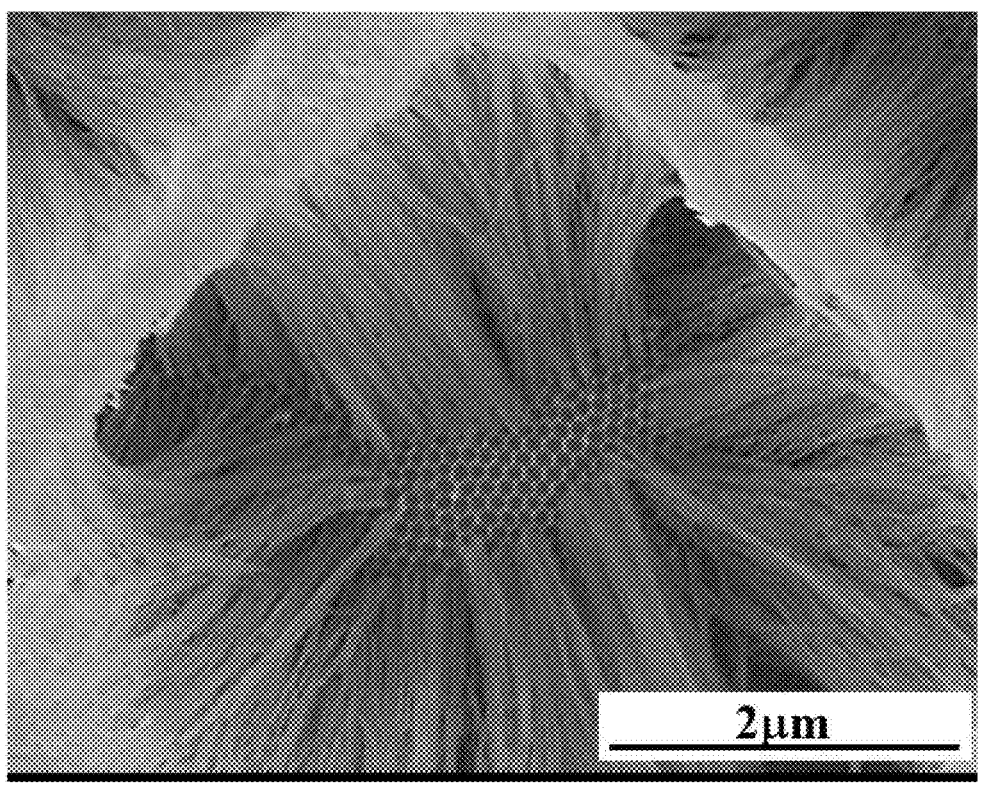

FIGS. 3A and 3B illustrate scanning electron microscope (SEM) images of the at least one well-aligned nanowire and the nanowire assembly according to an embodiment of the present invention.

Referring to FIG. 3A, at least one well-aligned nanowire before formation of the morphology according to an embodiment of the present invention as illustrated in FIG. 2 can be confirmed. Referring to FIG. 3B, morphology self-aggregated by capillary force between any one of well-aligned nanowires and the other nanowire can be confirmed.

FIG. 4 illustrates a flowchart for a method of manufacturing the nanowire bundle array according to an embodiment of the present invention.

Referring FIG. 4, the method of manufacturing the nanowire bundle array according to an embodiment of the present invention includes electrolytically polishing the base substrate at step S410.

At step S420, first anodization of the base substrate is carried out.

Subsequently, the base substrate subjected to the first anodization at step S430 is wet-etched.

At step S440, the wet-etched base substrate is subjected to second anodization to form at least one well-aligned nanowire.

At least one well-aligned nanowire may be formed by anodizing twice through steps S420 to S440. However, in another embodiment, anodizing may be carried out once more to form at least one nanowire that is not well aligned.

Subsequently, at step S450, pores of the well-aligned nanowires are expanded.

At step S460, the morphology is formed by some of the nanowires aggregated while being bent toward each other through capillary force induced by surface tension of a fluid between the nanowires aligned by expansion of the pores.

According to an embodiment, at step S460, the morphology wherein some of the nanowires are aggregated while being bent toward each other due to capillary force induced by surface tension of the fluid between the nanowires well aligned through expansion of the pores may be formed.

Hereinafter, the method of manufacturing the nanowire bundle array according to an embodiment of the present invention is described in detail referring to FIGS. 5A to 5F.

FIGS. 5A to 5F schematically illustrate a method of preparing the alumina nanowire bundle array according to an embodiment of the present invention.

With regard to the method of manufacturing the nanowire bundle array illustrated in FIGS. 5A to 5F, materials of the base substrate and the at least one nanowire are limited to aluminum and alumina.

However, the materials of the base substrate and the at least one nanowire are not limited to aluminum and alumina, and the materials of the base substrate and the at least one nanowire may be different. For example, the material of the at least one nanowire may be an oxide which is different from the material of the base substrate.

Figure 5A:
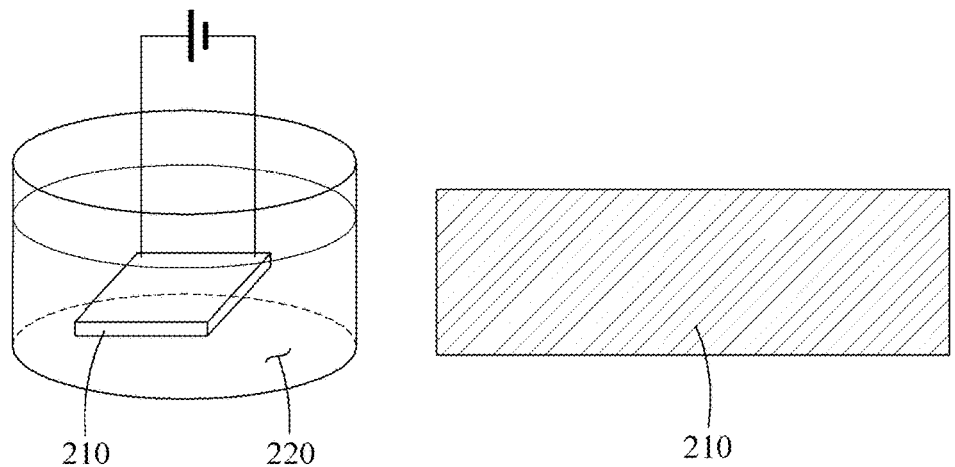
FIGS. 5A to 5F illustrate a method of manufacturing an alumina nanowire bundle array according to an embodiment of the present invention.

Referring to FIG. 5A, in the method of manufacturing the nanowire bundle array according to an embodiment of the present invention, a base substrate 210 composed of aluminum is soaked in a solution 220 prepared by mixing perchloric acid and ethanol, followed by performing electrolytic polishing.

The base substrate 210 is electrolytically polished using the mixed solution 220 including perchloric acid and ethanol, whereby a smooth surface treated on the base substrate 210 may be obtained.

The mixed solution 220 may be obtained by mixing perchloric acid and ethanol in various ratios. Preferably, a volumetric ratio of perchloric acid to ethanol is 1:4.

In addition, the aluminum base substrate 210 preferably has a purity of 99.99%.

In the method of manufacturing the nanowire bundle array according to an embodiment of the present invention, a voltage of 15 V to 25 V may be applied to the base substrate 210 submerged in the mixed solution 220 including perchloric acid and ethanol.

The voltage application may be performed for three minutes to ten minutes. When the voltage is applied for less than three minutes, a surface of the base substrate 210 is not sufficiently smooth. When the voltage is applied for longer than 10 minutes, a surface of the base substrate 210 is excessively treated and thus a non-uniform surface may be formed.

Figure 5B:
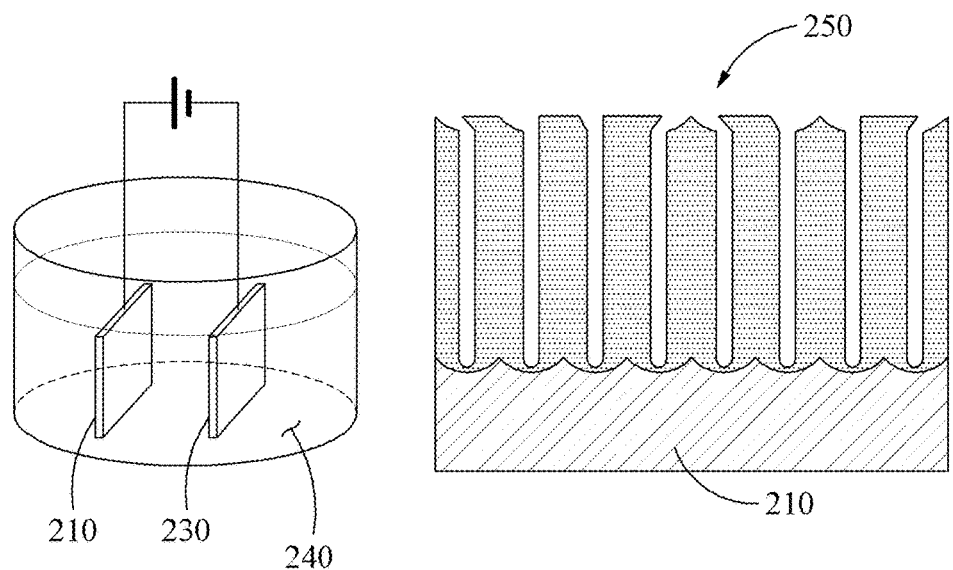

Referring to FIG. 5B, in the method of manufacturing the nanowire bundle array according to an embodiment of the present invention, the base substrate 210 of FIG. 5A is subjected to first anodization.

For example, in the method of manufacturing the nanowire bundle array according to an embodiment of the present invention, a positive electrode is connected to the base substrate 210 of FIG. 5A and a negative electrode is connected to a platinum (Pt) electrode substrate 230, followed by submersion in an oxalic acid solution 240 as an electrolyte. Subsequently, the base substrate 210 may be subjected to first anodization by applying voltage having predetermined magnitude.

The oxalic acid solution 240 is preferably an oxalic acid solution having a concentration of 0.3 M, and voltage applied to the base substrate 210 and the electrode substrate 230 may be particularly 35 V to 45 V, more particularly 40 V.

In addition, since the growth rates, pore sizes, and uniformity of anodic aluminum oxides (AAO) 250 generated in the base substrate 210 depend upon the temperature of the oxalic acid solution 240, the temperature of the oxalic acid solution 240 is preferably set to 0° C. to 15° C.

When the temperature of the oxalic acid solution 240 is within the aforementioned temperature range, uniformity of the anodic aluminum oxides 250 may be most stable. In addition, the anodizing is preferably performed for about six hours to 30 hours.

As illustrated in FIG. 5B, the anodic aluminum oxides (AAO) 250 having pores, which have a hexagonal array and are spaced from each other by an interval of 90 nm to 110 nm, are formed on the surface of the base substrate 210, through the aforementioned processes.

Figure 5C:
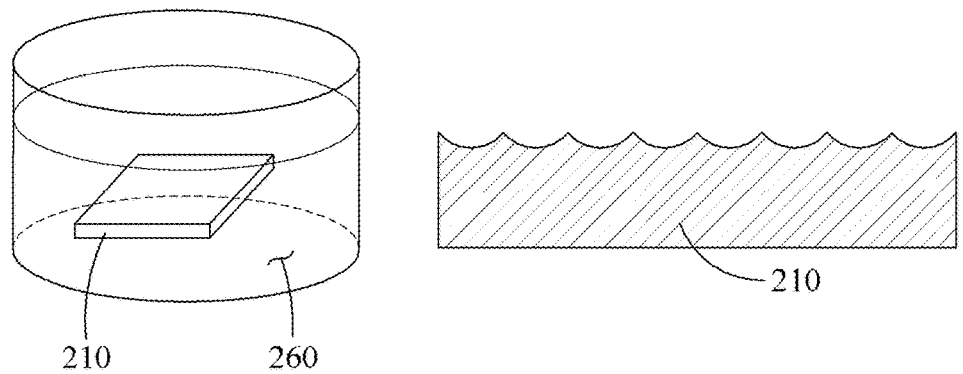

Referring to FIG. 5C, in the method of manufacturing the nanowire bundle array according to an embodiment of the present invention, the base substrate 210 subjected to the first anodization of FIG. 5B is wet-etched.

For example, an etching solution 260 is prepared by mixing chromic acid and phosphoric acid, and then, the base substrate 120 is submerged in the etching solution 260 for a predetermined time to etch the base substrate 120.

The etching solution 260 may be prepared by mixing chromic acid and phosphoric acid in various ratios. Preferably, 1.8% chromic acid and 6% phosphoric acid are mixed.

In addition, the temperature of the etching solution 260 is preferably set to 70° C. to 80° C., and etching time of the base substrate 120 is preferably set to three hours to five hours.

As illustrated in FIG. 5C, the anodic aluminum oxides (AAO) 250 are removed from the surface of the base substrate 210 and hexagonal concave grooves which are uniformly spaced from each other are present.

Figure 5D:
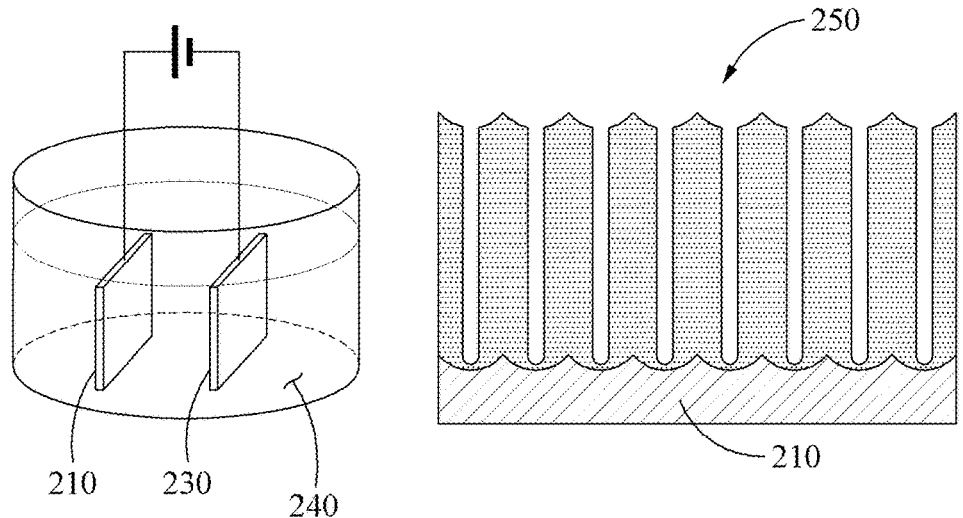

Referring to FIG. 5D, in the method of manufacturing the nanowire bundle array according to an embodiment of the present invention, the wet-etched base substrate of FIG. 5C is subjected to the second anodization to form at least one well-aligned nanowire.

For example, after connecting a positive electrode of the base substrate 210 which is wet-etched, connecting a negative electrode to the platinum (Pt) electrode substrate 230, and, while maintaining this state, submerging the substrates 210 and 230 in the oxalic acid solution 240 as an electrolyte, voltage having a predetermined magnitude is applied thereto, whereby the base substrate 210 is subjected to the second anodization.

The conditions of the second anodization processes illustrated in FIG. 5D are the same as those of the first anodization processes illustrated in FIG. 5B. The lengths of the anodic aluminum oxide nanowires 250 formed on a surface of the base substrate 210 may be controlled by adjusting anodization time.

For example, when the anodization is carried out for one minute to ten hours under the same conditions as those of the first anodization processes of FIG. 5B, the lengths of the anodic aluminum oxide nanowires 250 may be adjusted to 100 nm to 50 μm.

More particularly, when the temperature of the oxalic acid solution 240 is 10° C., the aluminum nanowires grow 5 μm length per hour. Therefore, anodization time may be properly adjusted considering a growth length dependent upon time.

As illustrated in FIG. 5D, the well-aligned hexagonal anodic aluminum oxide nanowires 250 are formed on the surface of the base substrate 210.

Figure 5E:
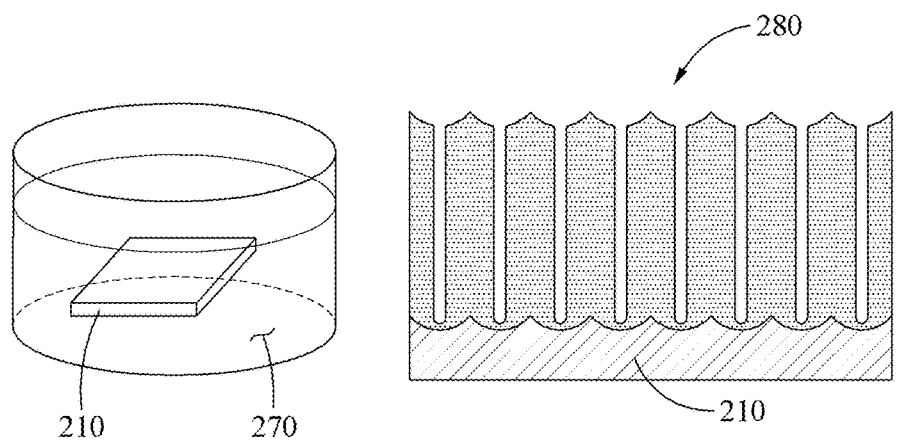

Referring to FIG. 5E, in the method of manufacturing the nanowire bundle array according to an embodiment of the present invention, pores of the well-aligned anodic aluminum oxide nanowires of FIG. 5D are expanded.

For example, as illustrated in FIG. 5E, the sizes of the pores of the anodic aluminum oxide nanowires 250 may be uniformly expanded, and the base substrate 210 subjected to the second anodization of FIG. 5D is submerged in a phosphoric acid solution 270 to form anodic aluminum oxide nanowires 280 having expanded pores.

The phosphoric acid solution 270 is preferably a phosphoric acid solution having a concentration of 5% by weight, and temperature thereof is preferably set to 25° C. to 45° C.

In addition, referring to FIG. 5E, the base substrate 210 is submerged in the phosphoric acid solution 270 for preferably 15 minutes to 60 minutes. When the temperature of the phosphoric acid solution 270 is set to 40° C. to 45° C., time of submerging the base substrate 210 in the phosphoric acid solution 270 may be shortened to 18 minutes to 24 minutes.

According to an embodiment, the pores may be more efficiently expanded by uniformly mixing the phosphoric acid solution 270 through stirring of the phosphoric acid solution 270 in a state in which the base substrate 210 is submerged in the phosphoric acid solution 270. In this case, the stirring is preferably performed at a rate of 300 rpm to 800 rpm.

Figure 5F:
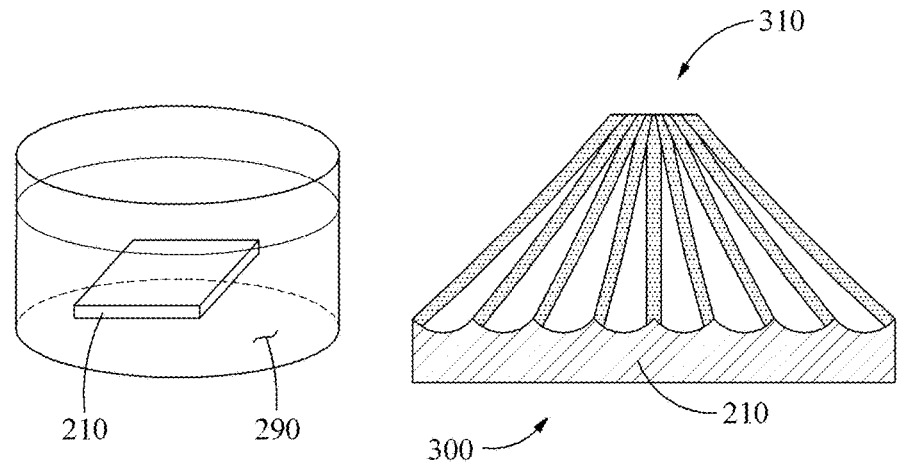

Referring to FIG. 5F, through the method of manufacturing the nanowire bundle array according to an embodiment of the present invention, a nanowire assembly having the morphology may be formed.

For example, a nanowire assembly having a morphology wherein the width of the nanowire assembly gradually decreases from one end of the nanowire assembly to the other end of the nanowire assembly may be formed through self-aggregation of the at least one anodic aluminum oxide nanowire well-aligned by the expanded pores.

According to an embodiment, some of the nanowires are aggregated while being bent toward each other by capillary force which is induced by surface tension of a fluid between the anodic aluminum oxide nanowires well aligned by the expanded pores.

More particularly, the aforementioned process of FIG. 5F may be performed by cleaning and drying the base substrate 210. As a cleaning solution for the cleaning, one or more selected from the group consisting of water, ethanol, methanol, isopropanol, and a supercritical fluid.

For example, the anodic aluminum oxide nanowires 280 having expanded pores illustrated in FIG. 5E are self-aggregated by capillary force of a liquid between the anodic aluminum oxide nanowires 280, through cleaning and drying processes. Accordingly, a nanowire assembly 310 having a morphology wherein the width of the nanowire assembly gradually decreases from one end of the nanowire assembly to the other end of the nanowire assembly may be formed.

In this case, some of the at least one anodic aluminum oxide nanowires are aggregated while being bent toward each other to form the morphology.

In addition, when ethanol, methanol, or isopropanol is used instead of water as a cleaning solution used in the cleaning process, cohesive force is changed due to different capillary forces thereof, and thus, the structures of alumina nanowires 280 may be changed.

For example, when a supercritical fluid having almost no surface tension is used as a cleaning solution, the anodic aluminum oxide nanowires 280 may have a uniform structure.

Structural change of the anodic aluminum oxide nanowires 280 or the nanowire assembly 310 may change optical characteristics of a nanowire bundle array 300.

In another embodiment, the method of manufacturing the nanowire bundle array may further include a step of depositing metal on a surface of the completed nanowire bundle array 300.

The metal may be changed according to intention of a designer. For example, the metal may be at least one selected from gold, silver, titanium, platinum, titanium oxide, and titanium nitride.

The nanowire bundle array manufactured through the aforementioned processes according to an embodiment of the present invention may be utilized in various fields by changing optical and chemical characteristics of optoelectronic devices.

FIGS. 6A to 6D illustrate scanning electron microscope (SEM) images representing morphologies formed by self aggregation of the at least one nanowire formed depending upon time taken for etching to expand pores, through the method of manufacturing the nanowire bundle array according to an embodiment of the present invention.

Figure 6A:
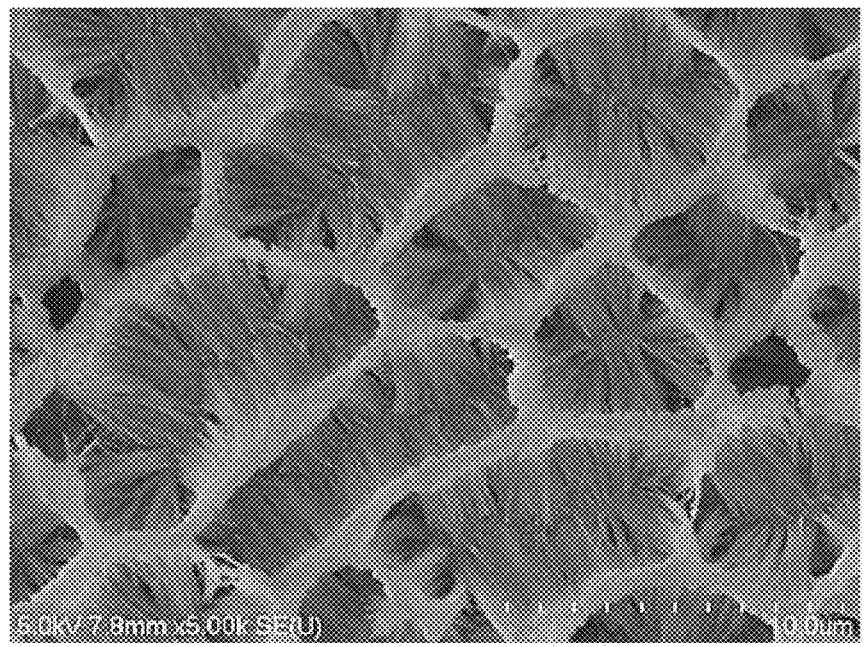
FIGS. 6A to 6D illustrate scanning electron microscope (SEM) images of morphologies formed through self aggregation of at least one nanowire formed according to time taken for etching to expand pores in a method of manufacturing a nanowire bundle array according to an embodiment of the present invention.
Figure 6B:
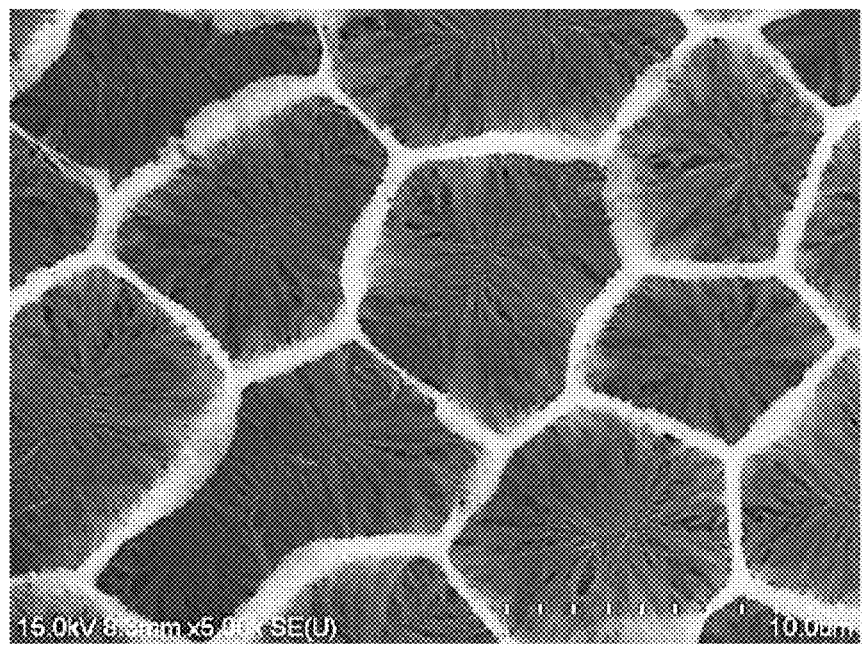

More particularly, with regard to time taken for the etching to expand pores, in the case of FIG. 6A, the etching time is 43 minutes. In the case of FIG. 6B, the etching time is 44 minutes, and in the case of FIG. 6C, the etching time is 45. In the case of FIG. 6D, the etching time is 46 minutes.

Referring to FIGS. 6A to 6D, it can be confirmed that, when time of the etching through submersion of the base substrate in a phosphoric acid solution as an etching solution to expand pores is varied from 43 minutes to 46 minutes, the thicknesses of anodic aluminum oxide nanowires and self-aggregated morphologies are varied.

Figure 6C:
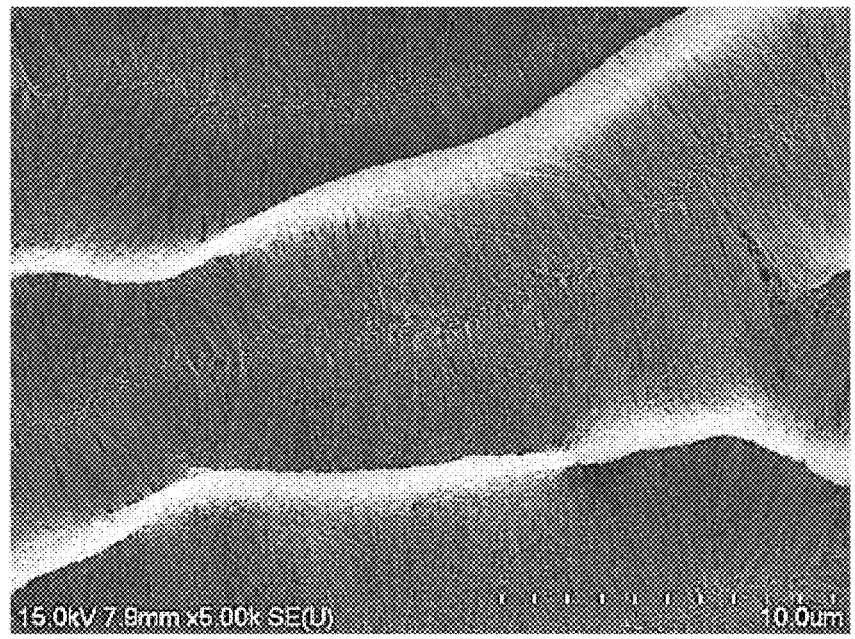
Figure 6D:

Referring to an image illustrated in FIG. 6A, it can be confirmed that, when etching for expanding pores is performed for a relatively short etching time (43 minutes), compared to FIGS. 6B to 6D (44 minutes to 46 minutes), a relatively thick nanowire assembly having high tensile strength is formed.

In the case of FIG. 6A, a nanowire assembly including partially aggregated nanowires having lower packing density and smaller cluster size is formed.

In addition, as illustrated in FIG. 6A, it can be confirmed that a formed morphology includes a plurality of bright white nano-ridges and a plurality of black nano-voids.

On the other hand, referring to an image illustrated in FIG. 6D, when the etching for expanding pores is performed for a relatively long time (46 minutes), compared to FIGS. 6A to 6C (43 minutes to 45 minutes), a morphology representing a larger aspect ratio and increased mechanical flexibility is formed.

The increased mechanical flexibility enables the nanowires to be more condensed. As a result, a thinner nanowire has relatively high packing density, a larger cluster, and fewer nano-ridges and nano-wires, compared to a thick nanowire, and thus, a relatively entangled nanowire assembly is formed.

Difference in the morphology affects optical characteristics of the haze film. The nanowire bundle array according to an embodiment of the present invention may control optical characteristics of the haze film through the aforementioned morphology control.

In addition, the nanowire bundle array according to an embodiment of the present invention may be a haze film increasing optical efficiency of optoelectronic devices by controlling optical transmittance and diffusion.

The haze film has the aforementioned optical haze characteristics and the nanowire bundle array according to an embodiment of the present invention may be the haze film. Optical transmittance and diffusivity passing through the haze film may be controlled by adhering the haze film to an optoelectronic device to increase optical efficiency of the optoelectronic device.

In addition, the nanowire assembly 110 according to an embodiment of the present invention is separatively attached to an adhesive substrate (not shown).

For example, the nanowire assembly may be separated from the base substrate used to form the nanowire assembly, using an adhesive substrate as an adhesive tape. The separated nanowire assembly may be attached to an optoelectronic device to be used as a haze film.

The aforementioned nanowire bundle array according to an embodiment of the present invention is used as a haze film, and an embodiment of attaching this haze film to an optoelectronic device and using the same is described in detail below.

FIGS. 7A to 7D schematically illustrate photographing a printed image through the haze film to which the nanowire bundle array according to an embodiment of the present invention is applied and illustrate a photographed image.

According to an embodiment of the present invention, the nanowire bundle array may be utilized as a haze film and may be attached to a surface of an optoelectronic device such as an organic photovoltaic (OPV) cell.

For example, the alumina nanowire assembly may be separated from a base substrate such as an aluminum substrate using an adhesive tape such as a scotch tape and attached to a surface of an optoelectronic device.

Figure 7A:
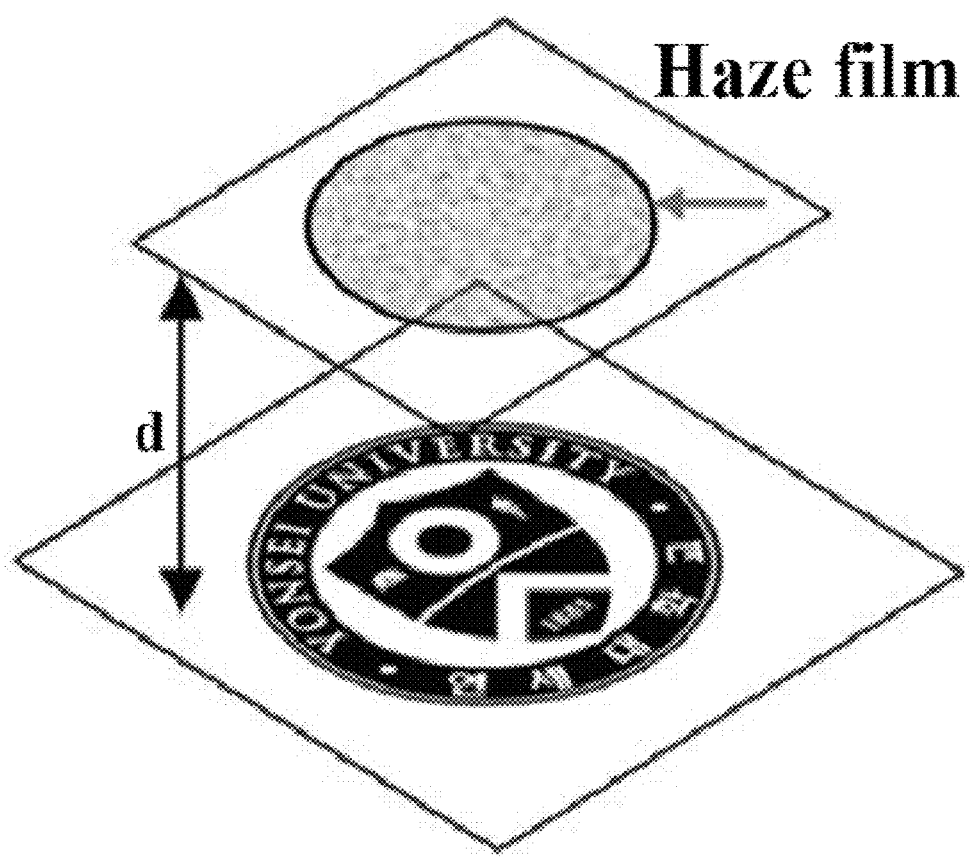
FIGS. 7A to 7D schematically illustrate photographing a printed image using a haze film to which a nanowire bundle array according to an embodiment of the present invention is applied, and illustrates a photographed image.

FIG. 7A schematically illustrates preparation for photographing a printed image through the haze film to which the nanowire bundle array according to an embodiment of the present invention is applied. Referring to FIG. 7A, the haze film according to an embodiment of the present invention is spaced from the printed image by a predetermined distance (d).

Figure 7B:
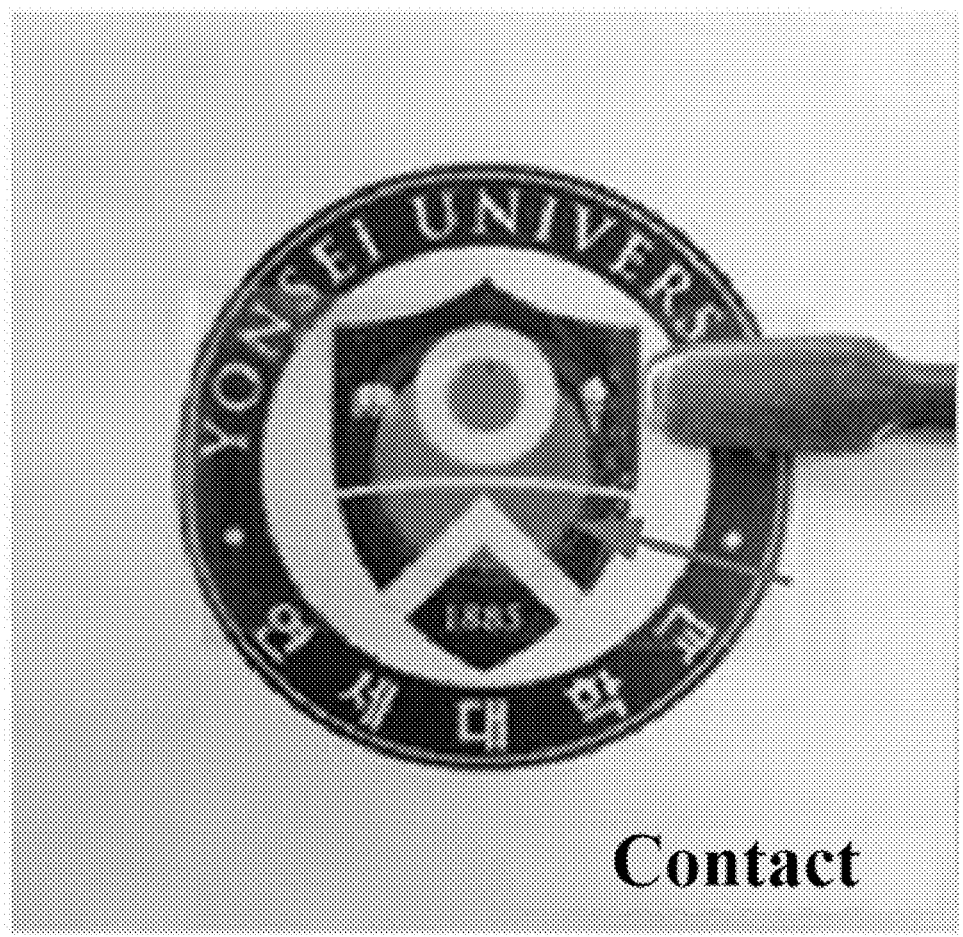
Figure 7C:
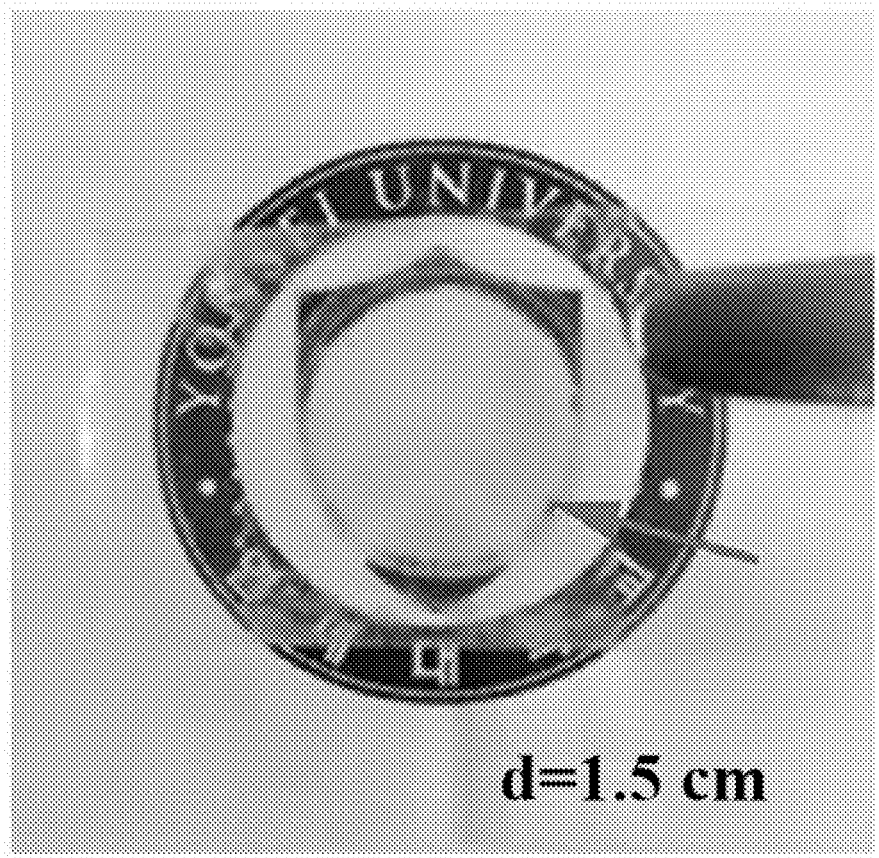
Figure 7D:
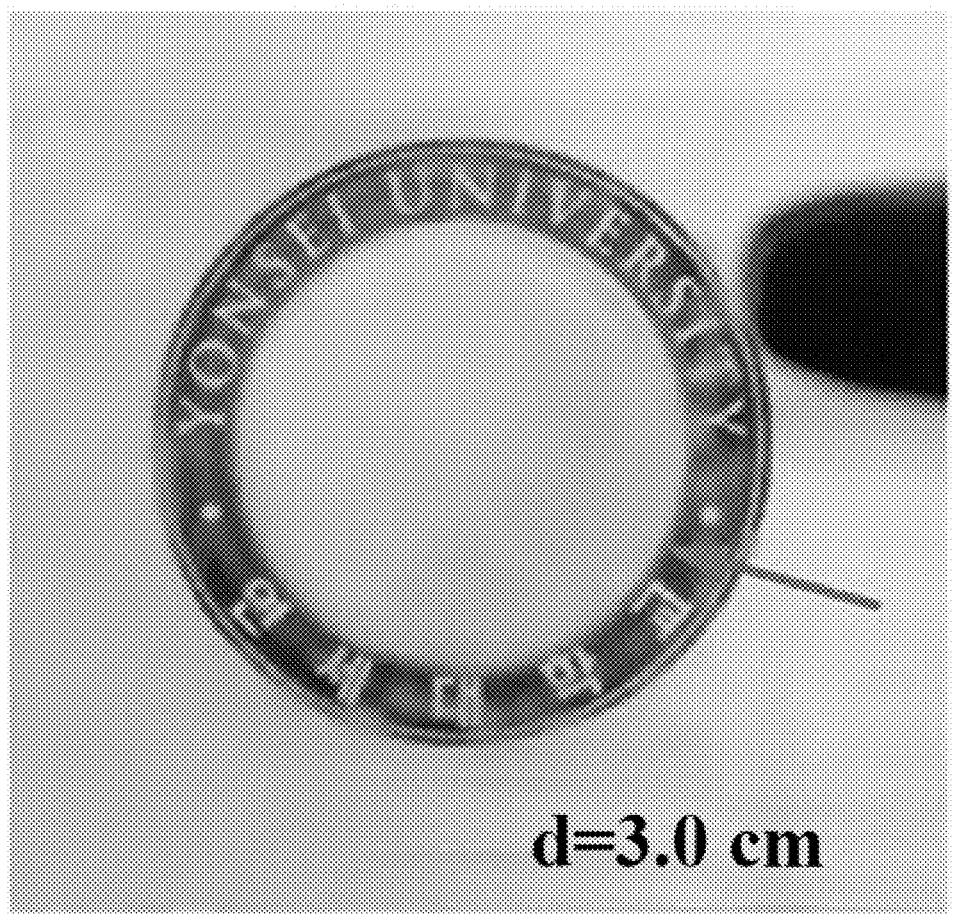

FIG. 7B illustrates the printed image and the haze film which contact each other, FIG. 7C illustrates the printed image and the haze film spaced from each other by a predetermined distance (d) of 1.5 cm, and FIG. 7D illustrates the printed image and the haze film spaced apart from each other by a distance (d) of 3.0 cm.

Referring to FIGS. 7B to 7D, when the haze film contacts the printed image (d=0, contact) as illustrated in FIG. 7B, a clear printed image may be observed. That is, a haze film having high optical transparency may be realized.

On the other hand, light incident upon the haze film and transmitted therethrough is scattered with increase of predetermined distance between the haze film and the printed image, and thus, an unclearly photographed printed image may be observed.

Figure 8A:
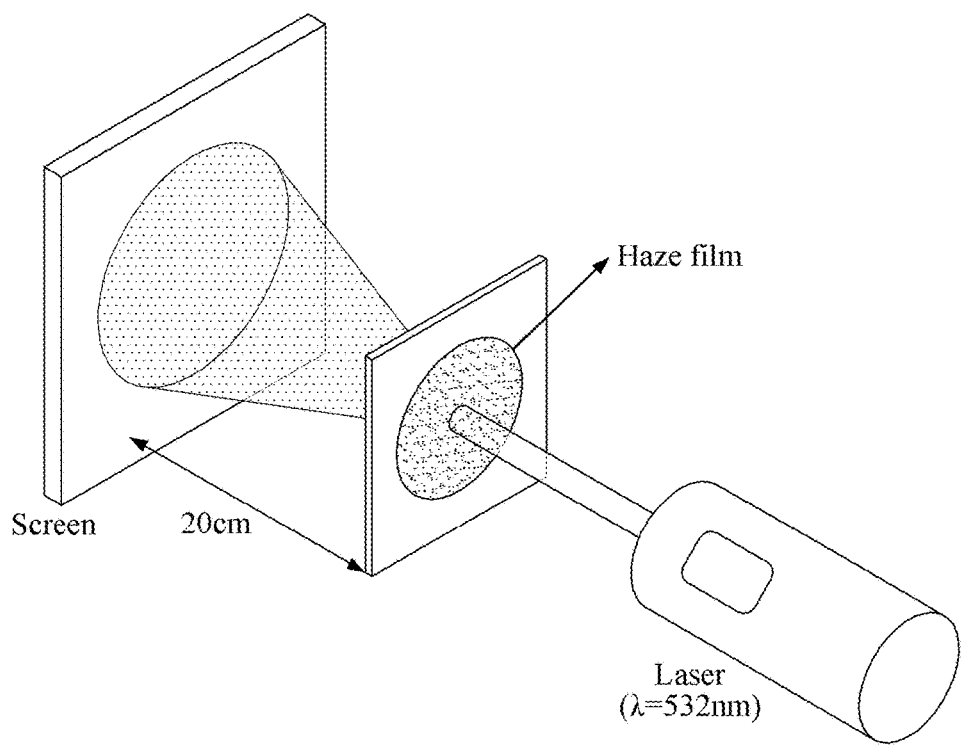
FIGS. 8A and 8B illustrate a schematic diagram for an experiment to evaluate transmittance and scattering characteristics of a haze film to which a nanowire bundle array according to an embodiment of the present invention is applied, and an image photographed through the experiment.
Figure 8B:
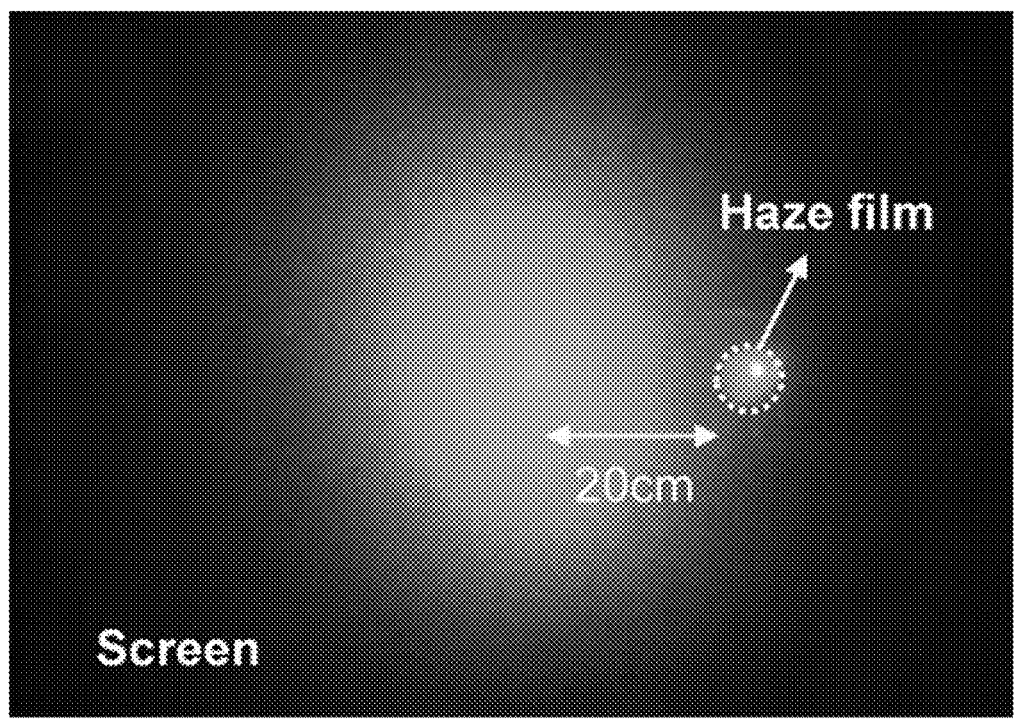

FIGS. 8A and 8B schematically illustrate an experiment to evaluate transmittance and scattering characteristics of the haze film to which the nanowire bundle array according to an embodiment of the present invention is applied, and illustrate images photographed through the experiment.

More particularly, referring to FIG. 8A, laser light is transmitted to the haze film to which the nanowire bundle array according to an embodiment of the present invention is applied, and light having passed through the haze film is irradiated while being diffused on a screen so as to visualize scattering of light observed in FIGS. 7B to 7D. The illuminated image is photographed by means of a camera.

In particular, the etching for expanding pores is carried out for 43 minutes using a green laser having a wavelength of 532 nm and laser light is transmitted to a haze film including an etched nanowire bundle array. Light which passed through the haze film is diffused and irradiated on a white screen 20 cm spaced from the haze film.

Referring to FIG. 8B, an area indicated with an arrow is a haze film. As illustrated in FIG. 8B, it can be confirmed that a laser beam passes through the haze film, and then is highly scattered and is diffused on a screen.

Figure 9B:
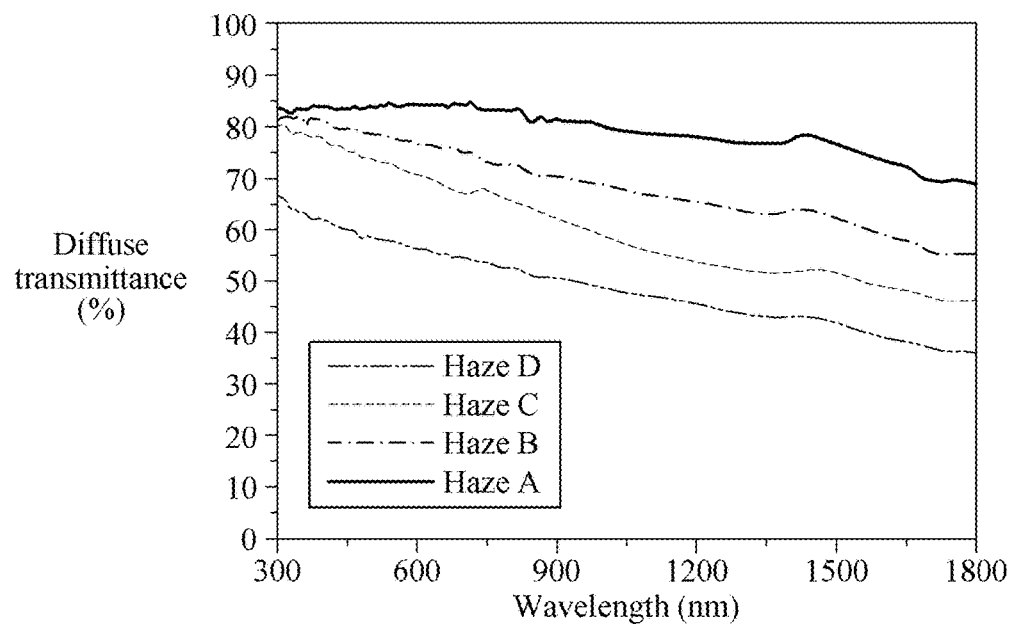
Figure 9C:
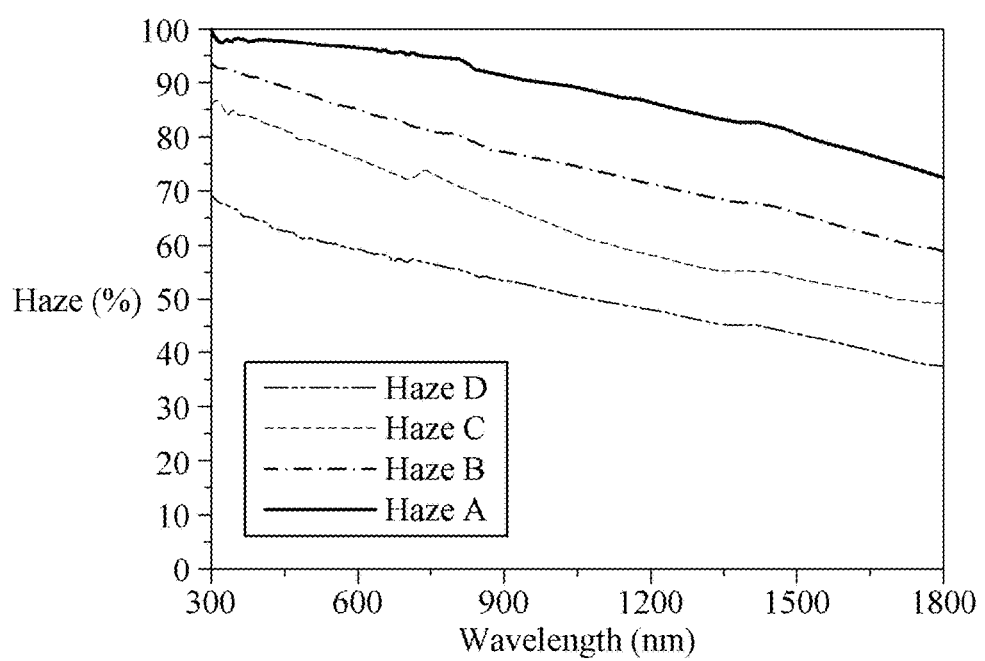

FIGS. 9A to 9C respectively illustrate total transmittance, diffusion transmittance and haze characteristics of haze films to which the nanowire bundle array according to an embodiment of the present invention is applied.

More particularly, FIGS. 9A to 9C illustrate graphs representing transmittances according to the wavelengths of light irradiated to haze films, to which a nanowire bundle array according to an embodiment of the present invention is applied, having different haze values.

As described above, a ratio of diffusion transmittance to total transmittance is referred to as haze.

With regard to hazes A to D illustrated in FIGS. 9A to 9C, time taken in etching to expand pores during a process of manufacturing the nanowire bundle array according to an embodiment of the present invention is 43 minutes, 44 minutes, 45 minutes, and 46 minutes, respectively. Referring to FIG. 9A, when the haze film to which the nanowire bundle array according to an embodiment of the present invention is applied, high total transmittances of 85% to 96% are exhibited.

In addition, FIG. 9B illustrates diffusion transmittance of the haze films to which the nanowire bundle array according to an embodiment of the present invention is applied. Referring to FIG. 9B, the haze films exhibit high diffusion transmittances of 35% to 85%.

FIG. 9C illustrates haze characteristics of the haze films to which the nanowire bundle array according to an embodiment of the present invention is applied. Referring to FIG. 9C, the haze films exhibit high haze values of 35% to 99%.

The diffusion transmittance characteristics and haze characteristics may be controlled by adjusting the aforementioned several processes as described above.

Figure 10:
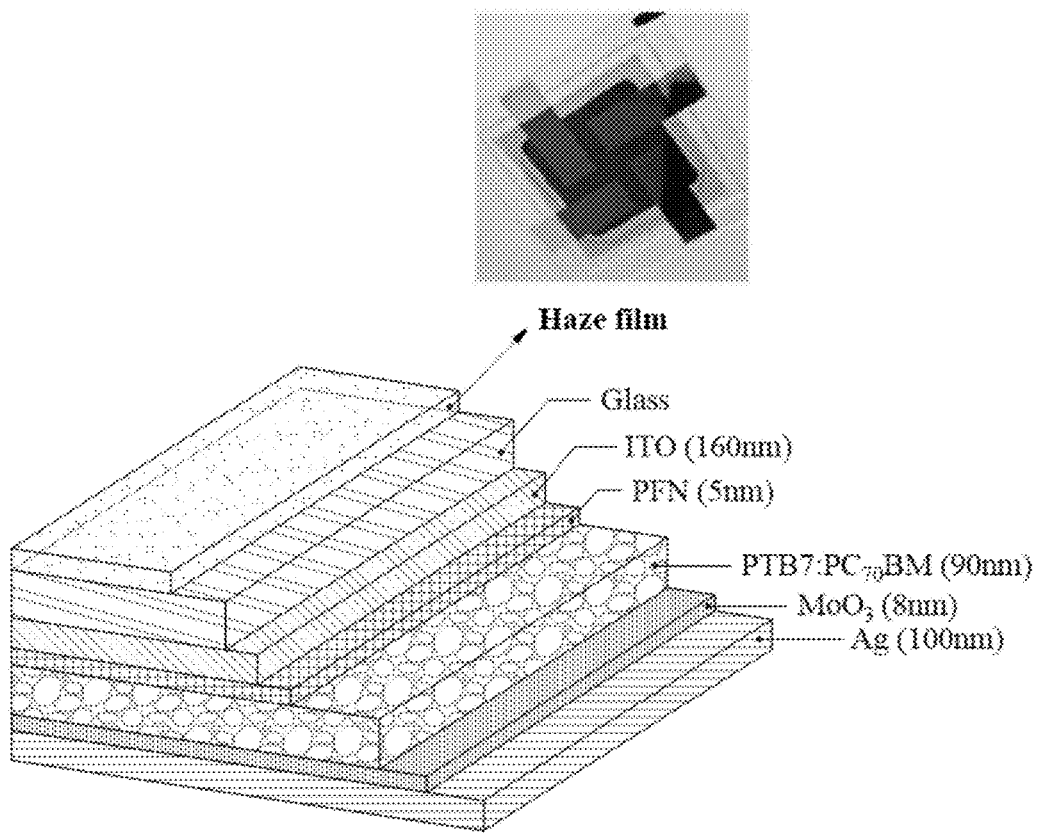
FIG. 10 illustrates a schematic view to evaluate optical characteristics of an organic photovoltaic cell including a haze film to which a nanowire bundle array according to an embodiment of the present invention is applied and which is attached to the organic photovoltaic cell.
Figure 11A:
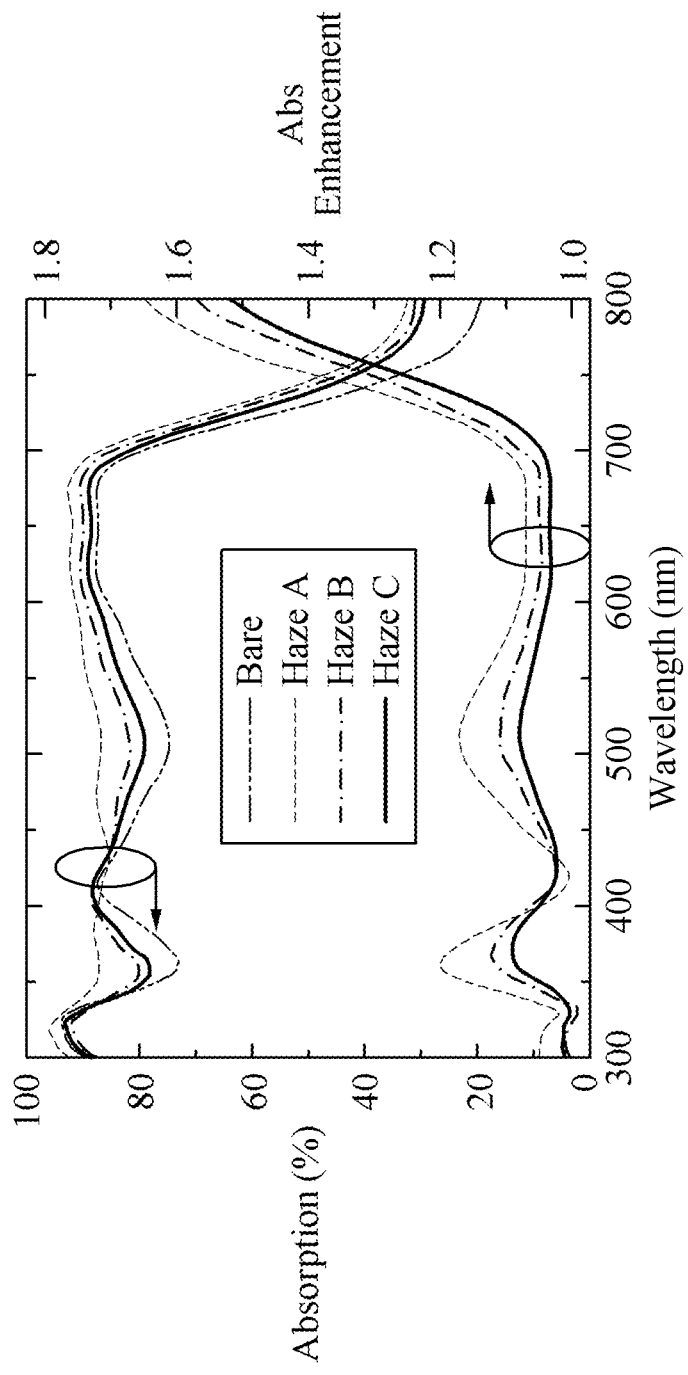
FIGS. 11A to 11C illustrate optical characteristics of the organic photovoltaic cell illustrated in the schematic view of FIG. 10.
Figure 11B:
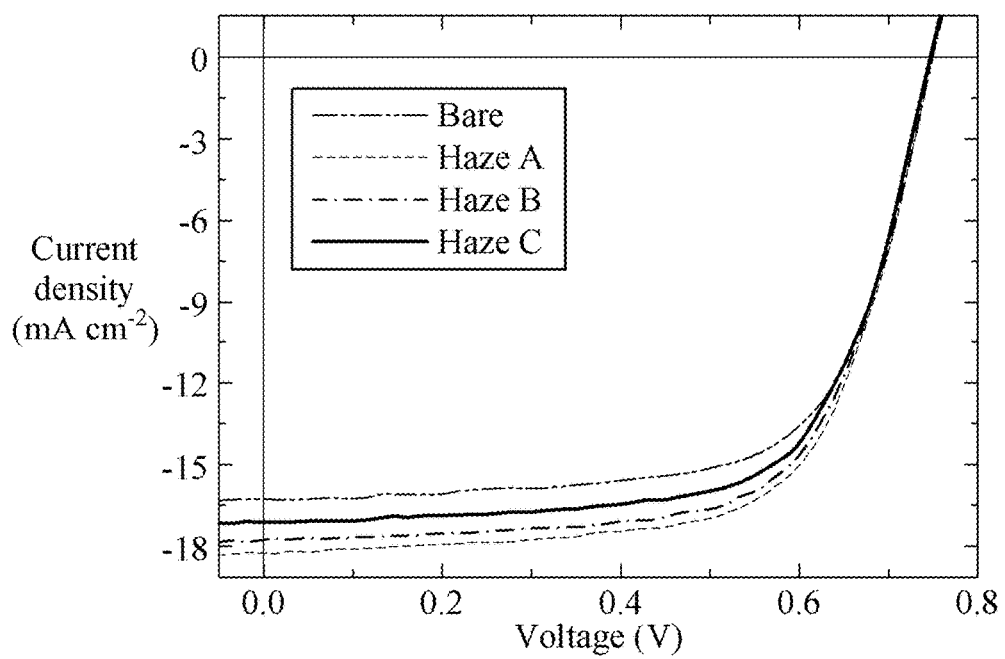
Figure 11C:
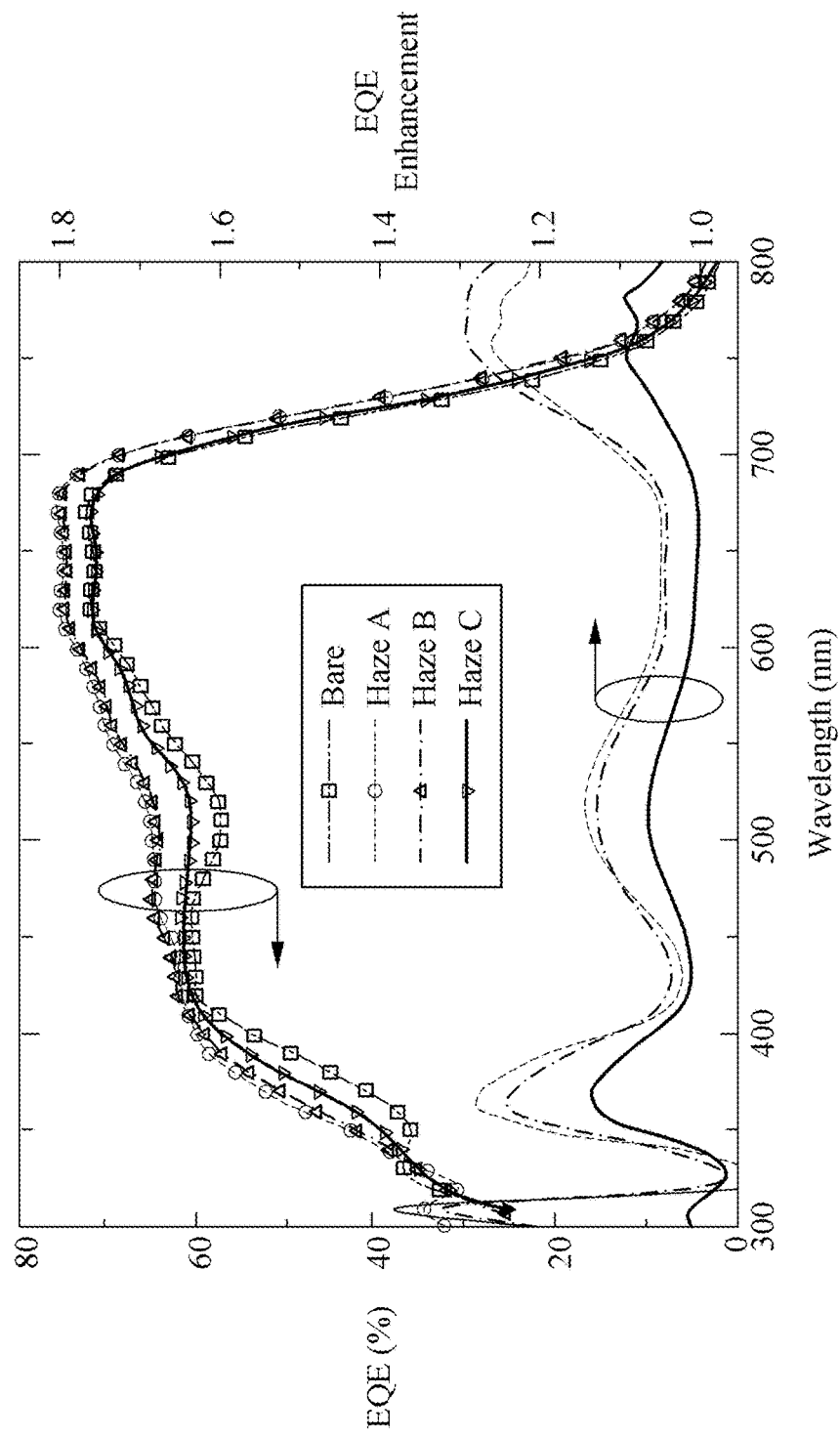

FIG. 10 illustrates a schematic view to evaluate optical characteristics of an organic photovoltaic cell including the haze film to which the nanowire bundle array according to an embodiment of the present invention is applied and which is attached to the organic photovoltaic cell. FIGS. 11A to 11C illustrate optical characteristics of an organic photovoltaic cell represented by the schematic view of FIG. 10.

More particularly, FIG. 11A illustrates absorption spectra of organic photovoltaic cells which include or do not include a haze film, to which a nanowire bundle array according to an embodiment of the present invention is applied, attached thereto. FIG. 11B illustrates current density-voltage (J-V) characteristics of an organic photovoltaic cell including the haze film attached thereto and an organic photovoltaic cell not including the haze film. FIG. 11C illustrates external quantum efficiency (EQE) spectra of the organic photovoltaic cells which include or do not include the haze film attached thereto.

Referring to FIG. 10, with regard to the constitution of the organic photovoltaic cell, the haze film, to which the nanowire bundle array according to an embodiment of the present invention is applied, is attached to a surface of a glass disposed at an uppermost part.

With regard to hazes A to C illustrated in FIGS. 11A to 11C, time taken to expand pores during a process of manufacturing the nanowire bundle array according to an embodiment of the present invention is 43 minutes, 44 minutes, and 45 minutes, respectively.

Referring to FIG. 11A, the organic photovoltaic cells including the haze film, to which the nanowire bundle array according to an embodiment of the present invention is applied and which is attached to the organic photovoltaic cell, exhibit remarkably decreased absorption spectra, compared to the organic photovoltaic cell to which the haze film is not attached.

In addition, as illustrated in FIG. 11A, absorbance increases at a valley of an absorption spectrum. Light absorption of the organic photovoltaic cell is increased due to the haze film to which the nanowire bundle array according to an embodiment of the present invention is applied. More particularly, since the nanowire bundle array included in the haze film to which the nanowire bundle array according to an embodiment of the present invention is applied includes a plurality of nano-voids and nano-ridges, light passing through the haze film is highly scattered and thus the path of incident light is extended.

Accordingly, light absorption characteristics of an active layer of an organic photovoltaic cell are also enhanced by the haze film to which the nanowire bundle array according to an embodiment of the present invention is applied.

In addition, in the case of the haze film to which the partially self-aggregated nanowire bundle array is applied, a scattering center is reinforced, compared to a haze film including a relatively dense self-aggregated nanowire bundle array, thus exhibiting relatively high diffusion transmittance and a relatively high optical haze value.

For example, as illustrated in FIG. 11A, it can be confirmed that the haze film having a relatively high optical haze value tends to more efficiently facilitate light absorption characteristics of the organic photovoltaic cell.

In the present embodiment, the structural characteristics and materials of the organic photovoltaic cells are the same except for the haze values of haze films. Accordingly, the length of a haze film having a low aggregation degree has a high haze value and the path of light passing through the haze film may be extended.

Referring to FIG. 11B, it can be confirmed that, in the cases of the organic photovoltaic cells including the haze film to which the nanowire bundle array according to an embodiment of the present invention is applied and which is attached to the organic photovoltaic cell, current density-voltage values are lower, and, when the haze film, to which the nanowire bundle array according to an embodiment of the present invention is applied, is attached to the organic photovoltaic cell, photoelectric transformation efficiency increases, compared to an organic photovoltaic cell to which the haze film is not attached.

Referring to FIG. 11C, it can be confirmed that, in the cases of the organic photovoltaic cells including the haze film to which a nanowire bundle array according to an embodiment of the present invention is applied and which is attached to the organic photovoltaic cell, EQE values are higher than that of an organic photovoltaic cell to which the haze film is not attached, and thus, when the haze film is attached to an organic photovoltaic cell, an external quantum efficiency is superior.

Figure 12:
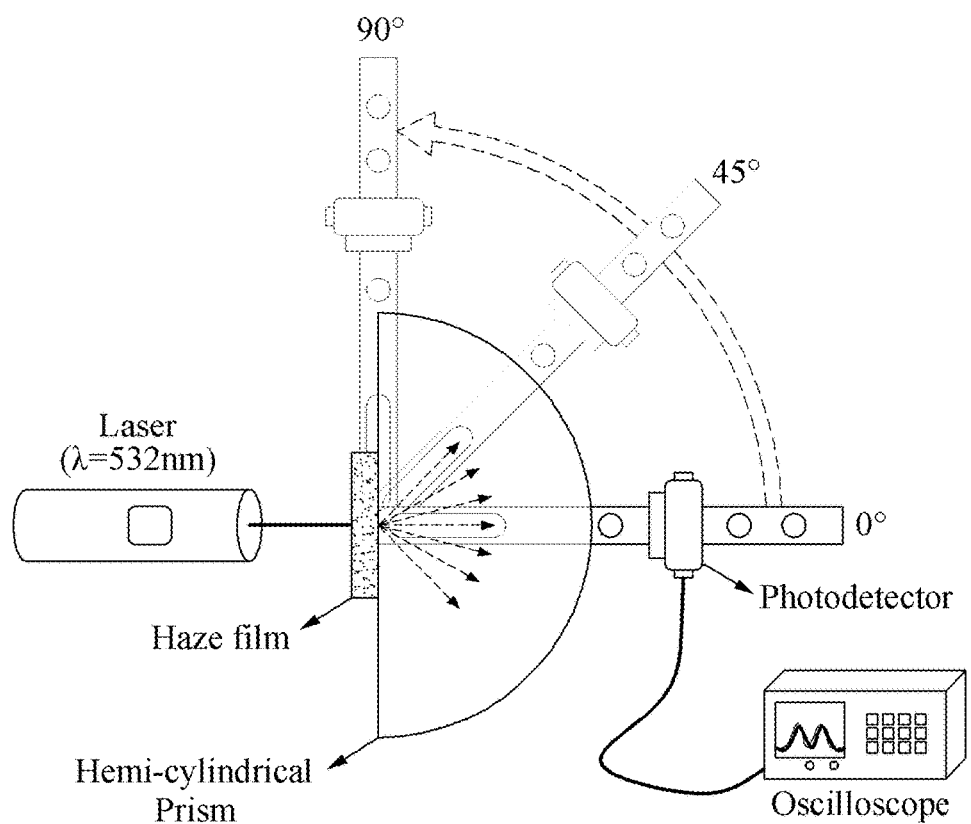
FIG. 12 illustrates a schematic view of an experiment device for quantitatively investigating a propagation direction of light diffused and transmitted at a glass substrate of an organic photovoltaic cell including a haze film to which a nanowire bundle array according to an embodiment of the present invention is applied and which is attached to the organic photovoltaic cell.
Figure 13A:
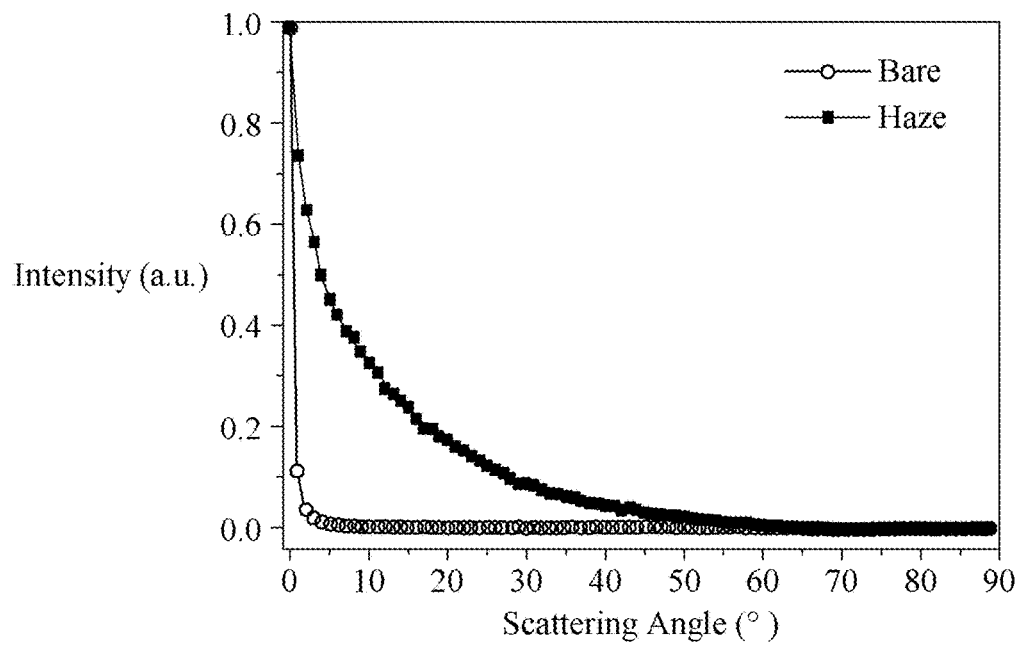
FIGS. 13A to 13C illustrate characteristics of light diffused and transmitted at the glass substrate of the organic photovoltaic cell of FIG. 12.
Figure 13B:
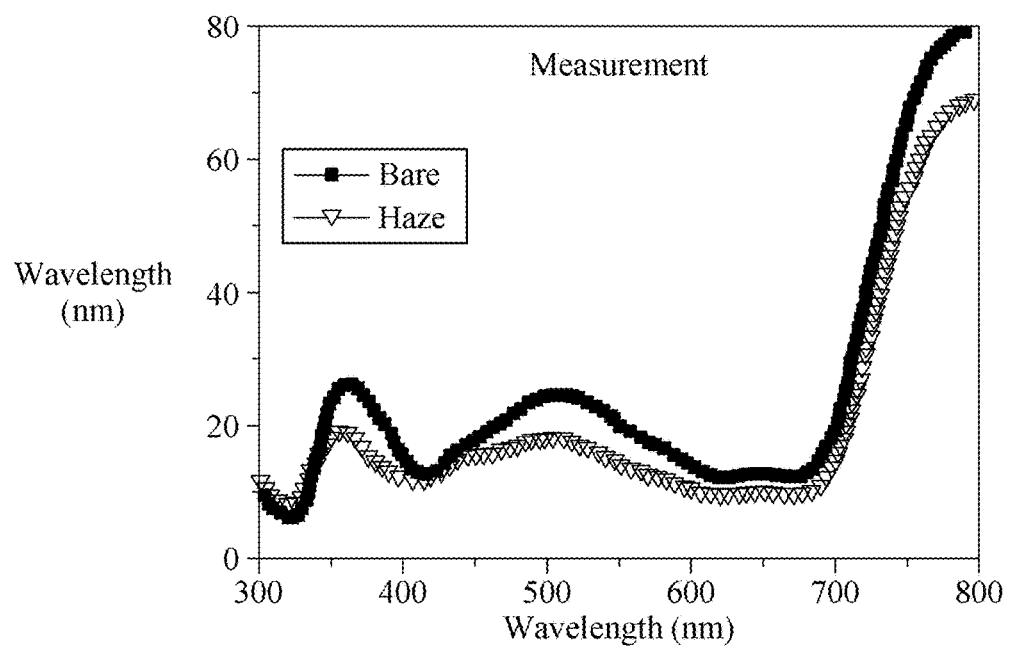
Figure 13C:
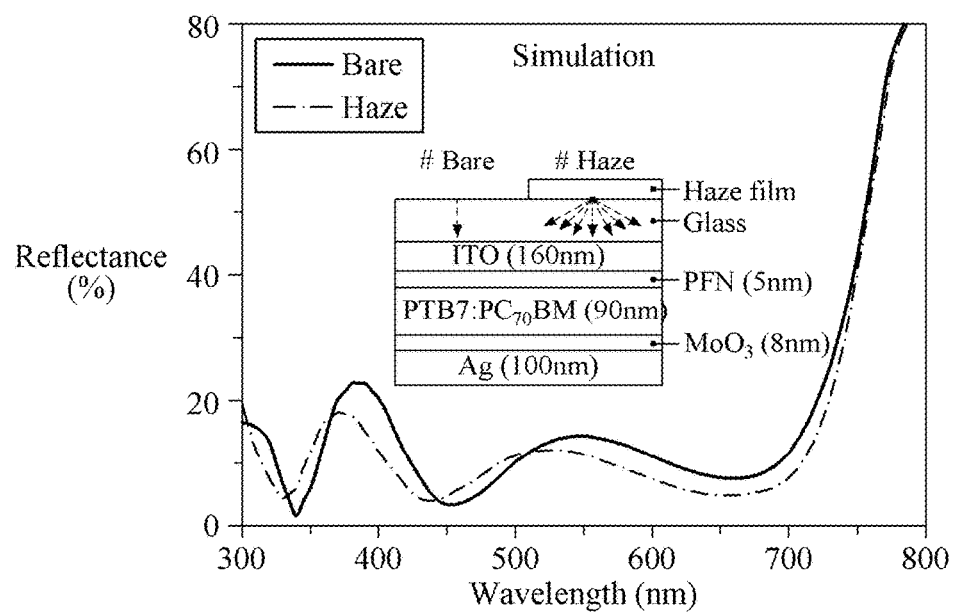

FIG. 12 illustrates a schematic view of an experiment device for quantitatively investigating a propagation direction of light diffused and transmitted at a glass substrate of an organic photovoltaic cell including a haze film to which a nanowire bundle array according to an embodiment of the present invention is applied and which is attached to the organic photovoltaic cell, and FIGS. 13A to 13C illustrate characteristics of light diffused by and transmitted through the glass substrate of the organic photovoltaic cell of FIG. 12.

More particularly, FIG. 13A illustrates graphs representing angle distributions of light diffused by and transmitting through a glass substrate of an organic photovoltaic cell to which the haze film, to which the nanowire bundle array according to an embodiment of the present invention is applied, is or is not attached. FIG. 13B illustrates graphs representing reflectance characteristics according to the wavelength of light diffused by and transmitting through glass substrates of an organic photovoltaic cell including the haze film attached thereto and an organic photovoltaic cell including does not include the haze film. FIG. 13C illustrates FDTD simulation results representing reflectance characteristics according to the wavelength of light diffused by and transmitting through glass substrates of an organic photovoltaic cell including the haze film attached thereto and an organic photovoltaic cell not including the haze film.

Referring to FIG. 12, a light detector fixed to a rotating arm is used, and a 532 nm green laser beam is irradiated to a hemi-cylindrical prism to which the haze film, to which the nanowire bundle array according to an embodiment of the present invention is applied, is attached.

As illustrated in FIG. 12, so as to quantitatively confirm a propagation direction of transmitted light at a glass disposed at an upper part of the organic photovoltaic cell and an active layer of the organic photovoltaic cell, angel distributions of a laser beam passing through the haze film can be measured.

Referring to FIG. 13A, through a result for angle distributions of light diffused by and transmitting through, as illustrated in FIG. 12, the glass substrate of the organic photovoltaic cell including the haze film to which the nanowire bundle array according to an embodiment of the present invention is applied and which is attached to the organic photovoltaic cell, it can be confirmed that light is diffused and transmitted at relatively large angles, compared to a glass substrate of an organic photovoltaic cell not including the haze film.

That is, the haze film to which the nanowire bundle array according to an embodiment of the present invention is applied may extend a path length of light incident on the active layer of the organic photovoltaic cell.

Referring to FIGS. 13B and 13C, it can be confirmed that the organic photovoltaic cell illustrated in FIG. 12, including the haze film to which the nanowire bundle array according to an embodiment of the present invention is applied and which is attached to the organic photovoltaic cell has higher light absorption.

More particularly, as illustrated in FIG. 13C, it can be confirmed that, when simulation results for single light incident, in a normal direction, on an area not including the haze film, to which the nanowire bundle array according to an embodiment of the present invention is applied, and scattered light with a predetermined angle, incident on area to which the haze film, to which the nanowire bundle array according to an embodiment of the present invention is applied, is attached are compared, the organic photovoltaic cell including the haze film to which the nanowire bundle array according to an embodiment of the present invention is applied and which is attached to the organic photovoltaic cell exhibits high light absorption as illustrated in FIG. 13B.

Figure 14A:
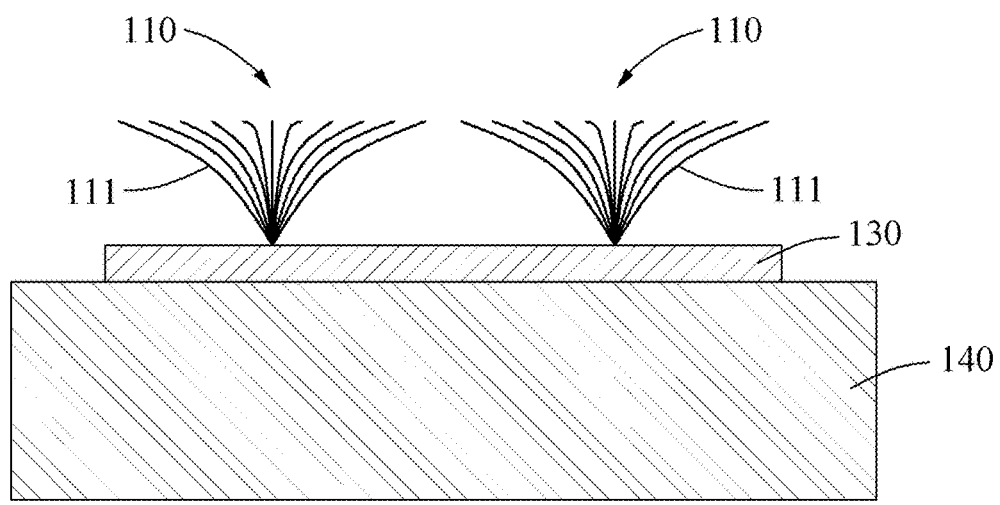
FIGS. 14A to 14B illustrate photoelectric elements to which a nanowire bundle array according to an embodiment of the present invention is applied.
Figure 14B:
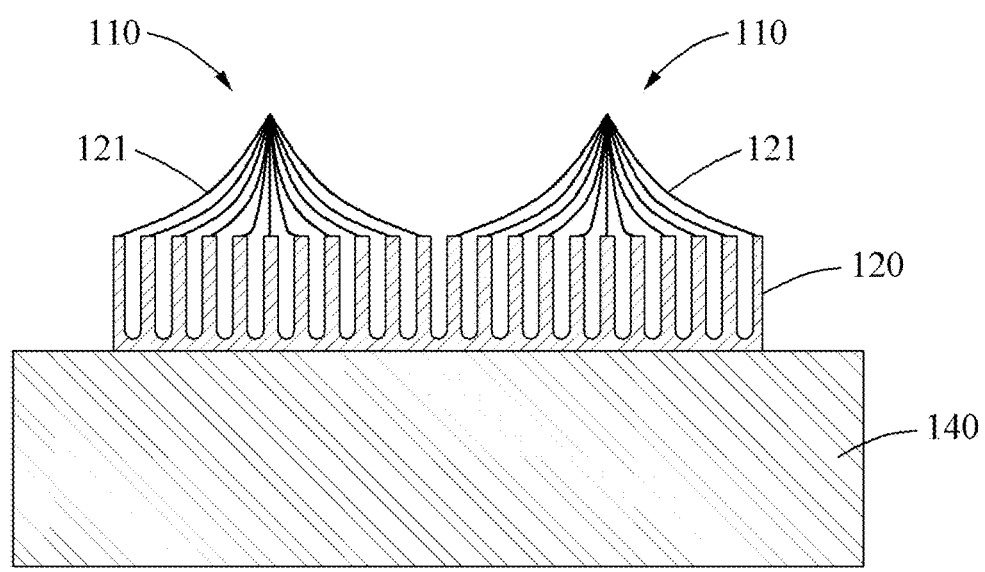

FIGS. 14A to 14B illustrate embodiments of photoelectric elements to which the nanowire bundle array according to an embodiment of the present invention is applied.

The nanowire bundle array according to an embodiment of the present invention controls transmittance and diffusion of light to increase efficiency of at least one of a photoelectric device, a photothermal device, and an optical device.

Referring to FIG. 14A, the nanowire assembly 110 of the nanowire bundle arrays according to an embodiment of the present invention illustrated in FIGS. 1A and 1B is separable attached to an adhesive substrate 130.

In an embodiment, the nanowire assembly 110 may be separated from the base substrate 120 by means of the adhesive substrate 130 such as an adhesive tape.

A nanowire bundle array composed of the nanowire assembly 110 which is attached to adhesive substrate 130 may be applied to glass, an optoelectronic device, a photothermal device, and an optical device 140.

In addition, in another embodiment, the nanowire bundle array illustrated in FIG. 14B may include the nanowire assembly 110 and the base substrate 120 supporting the nanowire assembly 110. In addition, the nanowire bundle array may be applied to glass, an optoelectronic device, a photothermal device and an optical device, controlling transmission and diffusion of light.

As described above, when the haze film to which the nanowire bundle array according to an embodiment of the present invention is applied is coated on a light incident surface of the optoelectronic device, reflection is decreased and an incident angle is enlarged by functioning as a photoactive layer. Accordingly, a light path is expanded and thus light absorption and efficiency are increased. In addition, the haze film may be utilized to increase conversion efficiency of a spectrum conversion layer converting wavelengths in a non-utilized wavelength area of the sunlight.

In addition, when the haze film to which the nanowire bundle array according to an embodiment of the present invention is applied is coated on a surface of a light emitting device such as an LED, outcoupling of light generated from an active layer is blocked due to total reflection, and thus, light extraction efficiency may be increased. In addition, by preventing light returning to an active layer from being absorbed again and changed into heat energy, performance deterioration of a device due to heat generation may be prevented.

Since the haze film to which the nanowire bundle array according to an embodiment of the present invention is applied has anti-fingerprint characteristics, it may be variously utilized in touch-type displays used in computer displays, navigators, smartphones, etc., glasses used in museums and galleries, etc.

According to embodiments of the present invention, so as to enhance characteristics of an optoelectronic device system and an optical system, at least one optical characteristic of total transmittance, diffusion transmittance and optical haze can be controlled.

In addition, according to embodiments of the present invention, optical characteristics of an optoelectronic device system and an optical system can be enhanced.

In addition, according to embodiments of the present invention, a thin nanowire bundle array having superior optical characteristics, an ultrahigh-performance broadband optical film, and a method of manufacturing the same are provided.

In addition, according to embodiments of the present invention, an ultrahigh-performance broadband optical film including a heat-resistant nanowire bundle array which is not deformed at high temperature is provided.

In addition, according to embodiments of the present invention, an ultrahigh-performance broadband optical film including a nanowire bundle array that exhibits a high haze value of 99% or more and a high transmittance of 85% or more is provided.

In addition, according to embodiments of the present invention, an ultrahigh-performance broadband optical film including a nanowire bundle array which is economical, uses safe materials, and is manufactured through easy wet-etching is provided.

Although the present invention has been described through limited examples and figures, the present invention is not intended to be limited to the examples. Those skilled in the art will appreciate that various modifications, additions and substitutions are possible, without departing from the scope and spirit of the invention It should be understood, however, that there is no intent to limit the invention to the embodiments disclosed, rather, the invention is to cover all modifications, equivalents, and alternatives falling within the spirit and scope of the invention as defined by the claims.

What is claimed is:

1. A nanowire bundle array, comprising a nanowire assembly composed of at least one nanowire and having morphology configured such that a width of the nanowire assembly is gradually decreased from one end of the nanowire assembly to the other end of the nanowire assembly, wherein a plurality of nanowire assemblies is spaced from each other by a predetermined interval in the nanowire bundle array and the nanowire bundle array controls a path of incident light by controlling the morphology,
wherein the nanowire bundle array has optical haze by controlling scattering of the light based on morphology comprising a plurality of nano-voids and a plurality of nano-ridges.

2. The nanowire bundle array according to claim 1, wherein the morphology is formed through self-aggregation by capillary force between any one of the at least one nanowire and other nanowires.

3. The nanowire bundle array according to claim 2, wherein the morphology is formed by some of the nanowires aggregated while being bent toward each other through capillary force induced by surface tension of a fluid between the nanowires.

4. The nanowire bundle array according to claim 1, wherein the morphology comprises a funnel structure as a nanowire assembly unit composed of the at least one nanowire, and
the funnel structure is formed on a microscale and a plurality of funnel structures is spaced from each other on a microscale distance.

5. The nanowire bundle array according to claim 1, wherein, in the morphology, any one of the at least one nanowire is titled in a certain direction and supported by and bonded to other nanowires.

6. The nanowire bundle array according to claim 1, wherein, in the morphology, at least one nanowire in a bent state is bonded with other nanowires.

7. The nanowire bundle array according to claim 1, wherein, in the morphology, the at least one nanowire at an upper part of the nanowire assembly is aggregated, and the nanowires at a lower part of the nanowire assembly are spaced from each other.

8. A nanowire bundle array, comprising a nanowire assembly composed of at least one nanowire and having morphology configured such that a width of the nanowire assembly is gradually decreased from one end of the nanowire assembly to the other end of the nanowire assembly, wherein a plurality of nanowire assemblies is spaced from each other by a predetermined interval in the nanowire bundle array and the nanowire bundle array controls a path of incident light by controlling the morphology,
wherein the nanowire assembly is separatively attached to an upper part of an adhesive substrate.

9. A nanowire bundle array, comprising a nanowire assembly composed of at least one nanowire and having morphology configured such that a width of the nanowire assembly is gradually decreased from one end of the nanowire assembly to the other end of the nanowire assembly, wherein a plurality of nanowire assemblies is spaced from each other by a predetermined interval in the nanowire bundle array and the nanowire bundle array controls a path of incident light by controlling the morphology,
wherein the nanowire bundle array increases efficiency of at least one of an optoelectronic device, a photothermal device, and an optical device by controlling transmittance and diffusion of the light.

10. The nanowire bundle array according to claim 1, wherein the at least one nanowire is made of any one of alumina (Al2O3) and titanium dioxide (TiO2).

11. The nanowire bundle array according to claim 1, wherein a length of each of the at least one nanowire is 100 nm to 50 μm.

12. The nanowire bundle array according to claim 1, wherein a thickness of each of the at least one nanowire is 10 nm to 70 nm.

13. The nanowire bundle array according to claim 1, wherein an interval between the nanowires is 500 nm or less.

14. The nanowire bundle array according to claim 1, wherein a height of the nanowire assembly is 100 nm to 30 μm.

15. A nanowire bundle array, comprising a base substrate; and nanowire assemblies spaced from each other by a predetermined interval on the base substrate, wherein the nanowire assemblies comprise at least one nanowire and the nanowire bundle array has morphology configured such that a width of the nanowire bundle array gradually decreases from one end of the nanowire bundle array contacting the base substrate to the other end of the nanowire bundle array, and wherein the nanowire bundle array increases efficiency of at least one of an optoelectronic device, a photothermal device, and an optical device by controlling transmittance and diffusion of light.

16. The nanowire bundle array according to claim 15, wherein the morphology is formed through self-aggregation by capillary force between any one of the at least one nanowire and other nanowires.

17. The nanowire bundle array according to claim 15, wherein, in the morphology, the nanowires at an upper part of the nanowire assembly are aggregated, and the nanowires at a lower part of the nanowire assembly are spaced from each other.

18. A method of manufacturing a nanowire bundle array, the method comprising:

electrolytically polishing a base substrate;

forming at least one nanowire on the base substrate by anodizing the base substrate;

expanding pores of the at least one nanowire; and forming a nanowire assembly having a morphology configured such that a width of the nanowire assembly gradually decreases from one end of the nanowire assembly to the other end of the nanowire assembly, by controlling self-aggregation of the at least one nanowire having the expanded pores, wherein the nanowire bundle array increases efficiency of at least one of an optoelectronic device, a photothermal device, and an optical device by controlling transmittance and diffusion of light.

* * * * *